(12) United States Patent
Finger et al.

(10) Patent No.: US 7,083,040 B2
(45) Date of Patent: Aug. 1, 2006

(54) TENSIONER, AS FOR A BELT CLEANER

(75) Inventors: Keith E Finger, Northampton, PA (US); George T. Mott, Alburtis, PA (US)

(73) Assignee: ASGCO Manufacturing, Inc., Allentown, PA (US)

( * ) Notice: Subject to any disclaimer, the term of this patent is extended or adjusted under 35 U.S.C. 154(b) by 0 days.

(21) Appl. No.: 10/991,549

(22) Filed: Nov. 18, 2004

(65) Prior Publication Data

US 2005/0121294 A1   Jun. 9, 2005

Related U.S. Application Data

(62) Division of application No. 09/808,657, filed on Mar. 15, 2001, now Pat. No. 6,948,609.

(60) Provisional application No. 60/191,554, filed on Mar. 23, 2000, provisional application No. 60/247,520, filed on Nov. 9, 2000.

(51) Int. Cl.
   *B65G 45/00* (2006.01)
(52) U.S. Cl. .............. 198/499; 198/497; 267/166
(58) Field of Classification Search ............. 198/499, 198/497, 494, 495; 267/166
   See application file for complete search history.

(56) References Cited

U.S. PATENT DOCUMENTS

| | | | |
|---|---|---|---|
| 4,533,036 A | 8/1985 | Gordon | |
| 4,598,823 A | 7/1986 | Swinderman | |
| 4,664,250 A | 5/1987 | Jakobs | |
| 4,754,868 A | 7/1988 | Hughes et al. | |
| 4,836,356 A * | 6/1989 | Mukai et al. | 198/499 |
| 4,838,409 A | 6/1989 | Rappen | |
| 4,925,434 A | 5/1990 | Swinderman et al. | |
| 4,995,851 A | 2/1991 | Taylor et al. | |
| 5,201,402 A | 4/1993 | Mott | |
| 5,222,589 A | 6/1993 | Gordon | |
| 5,378,202 A | 1/1995 | Swinderman | |
| 5,725,083 A * | 3/1998 | Archer | 198/499 |
| 5,887,702 A | 3/1999 | Mott | |
| 5,975,281 A * | 11/1999 | Yoshizako et al. | 198/499 |
| 5,992,614 A | 11/1999 | Mott | |
| 6,003,657 A * | 12/1999 | Mott | 198/499 |
| 6,056,112 A | 5/2000 | Wiggins | |
| 6,152,290 A | 11/2000 | Mott | |

OTHER PUBLICATIONS

ASGCO, New Mini-Skalper System: Ideal For Smaller Pulleys, 1999 ASGCO Manufacturing, Inc, Allentown, PA http://www.asgco.com, 1 Page.

ASGCO, Excalibur: Sanitary and Safe Belt Cleaner, 2000,ASGCO Manufacturing, Inc., Allentown, PA http://www.asgco.com, 1 Page.

ASGCO, Key Features of the Excalibur Belt Cleaning System, , ASGCO Manufacturing, Inc., Allentown, PA , http://www.asgco.com, 2 Pages.

(Continued)

*Primary Examiner*—Gene O. Crawford
*Assistant Examiner*—Rashmi Sharma
(74) *Attorney, Agent, or Firm*—Dann, Dorfman, Herrell & Skillman, P.C.

(57) ABSTRACT

A tensioner comprises inner and outer collars engaging a blade holder and a housing. A torsion spring between the collars tensions a blade. One of the collars engages the housing, such as by a locking handle, for fixing the spring tension. The housing may serve to shield the tensioner from debris.

31 Claims, 27 Drawing Sheets

OTHER PUBLICATIONS

ASGCO, Installation Operation & Maintenance Manual, , ASGCO Manufacturing, Inc., Allentown, PA, 8 Pages.

Martin Engineering, Martin Piglet, Belt Cleaner and Tensioners Operator's Manual, 1999, 30 Pages.

McMaster-Carr, Clamping Knobs, pp. 1864 and 1865.

ARCH Gordon Saber Belt Cleaners, Secondary Conveyor Belt Cleaner and Mini Saber, http://www.archenv.com/products/belt_cleaners/..., 1999, 4 Pages.

ARCH Gordon Saber Primary Conveyor Belt Cleaner [EN], Mini Saber and Saber, www.aeec.com/products/belt_cleaners/..., 2001, 6 Pages.

Martin Engineering, Piglet Pre-Cleaner and Secondary Cleaner, http://www.martin-ent.com/cgi-bin/entropy.cgi?$template-cgi..., 2000, 2 Pages.

Martin Engineering, Technical Data Sheet L3370-08-12/97, Piglet Belt Cleaners, 1997, 2 Pages.

Martin Engineering, Piglet Pre-Cleaner and Secondary Cleaner, http://www.martin-ent.com/cgi-bin/entropy.cgi?..., Date Unknown, 2 Pages.

Baking Industry Sanitation Standards Committee, http://bissc.org/baking.htm, 1998, 11 Pages.

International Search Report, PCT/US01/09000, May 9, 2001.

* cited by examiner

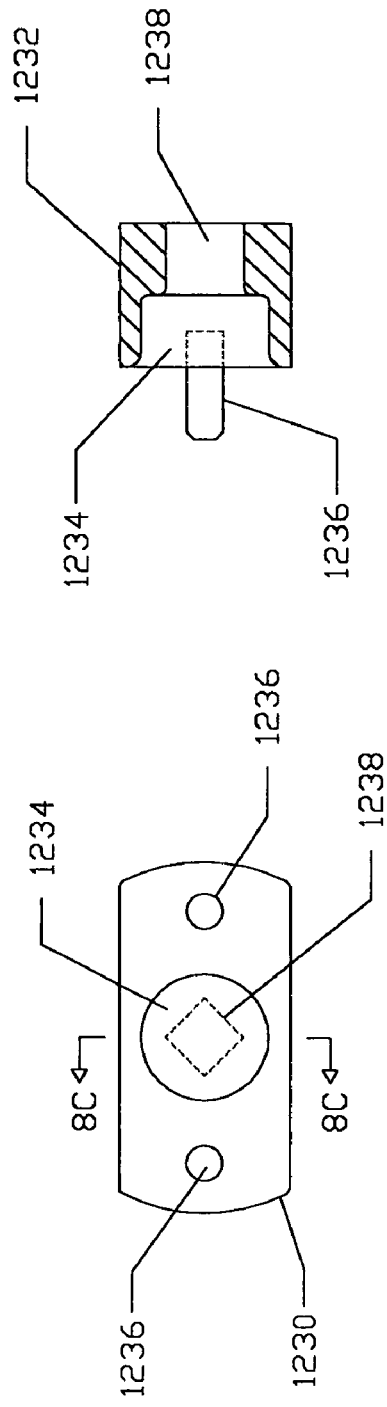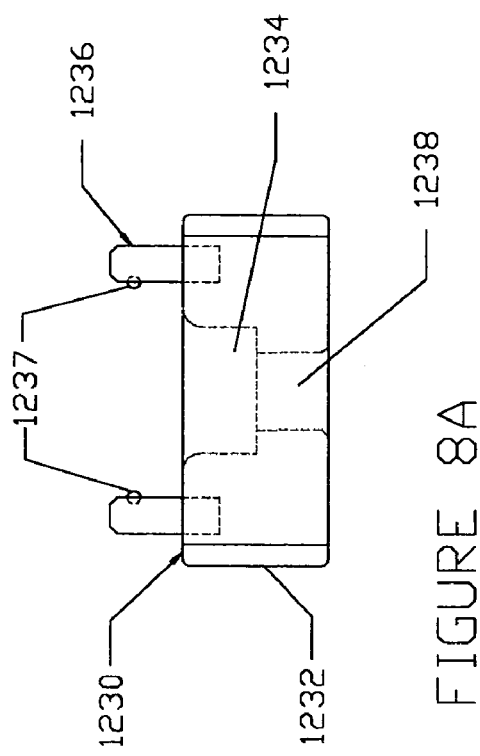

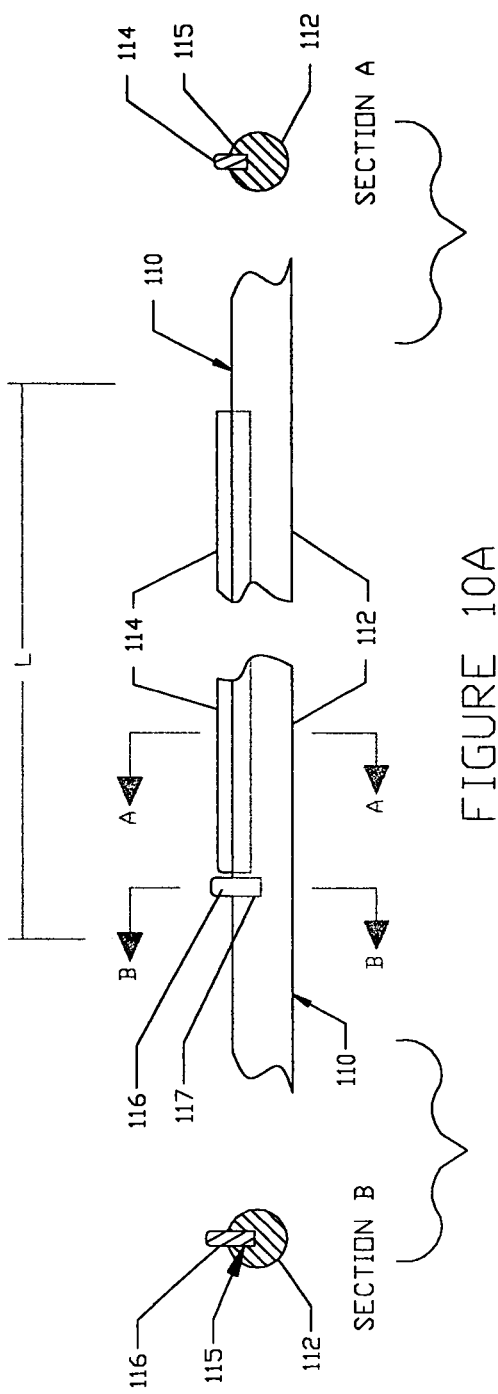

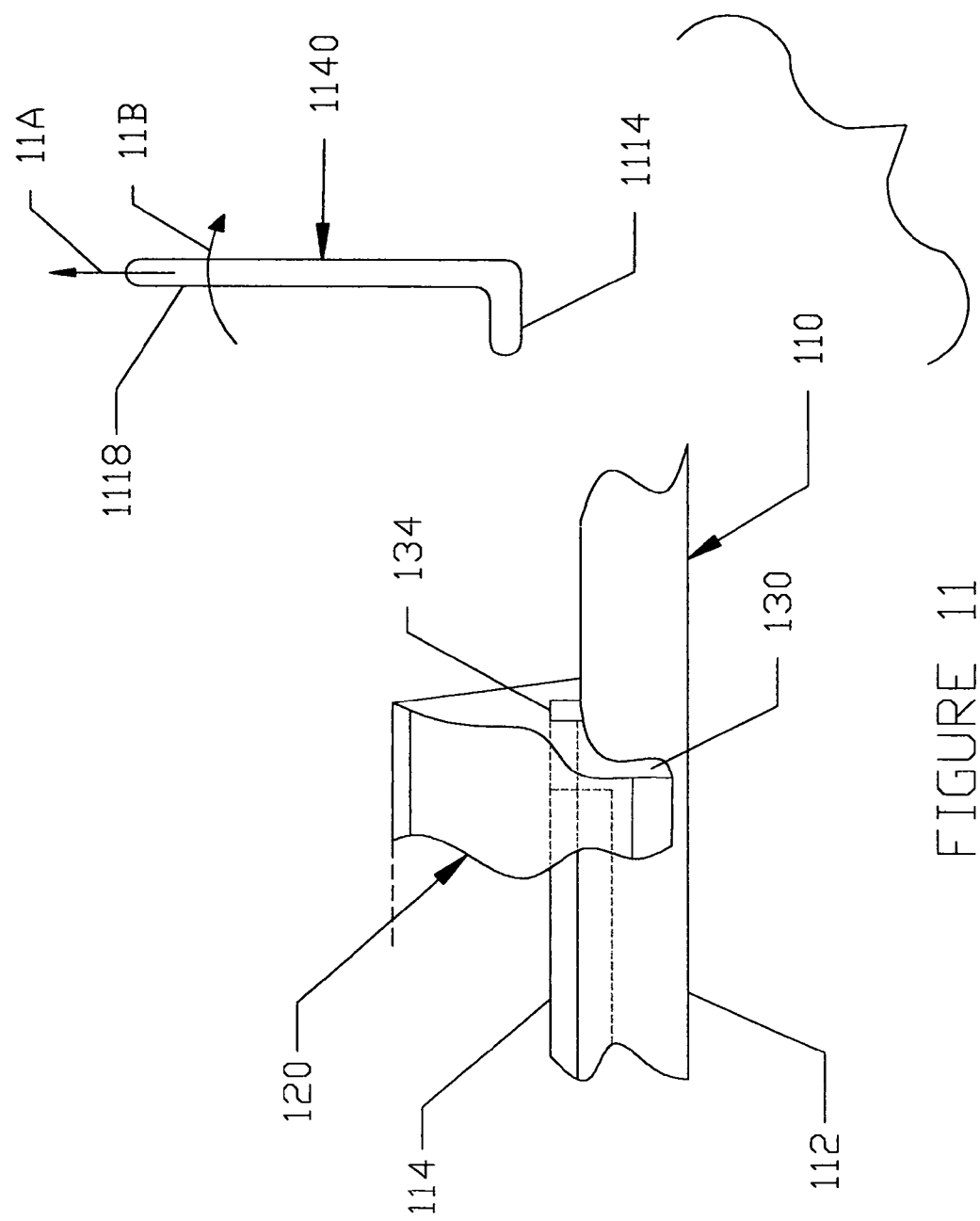

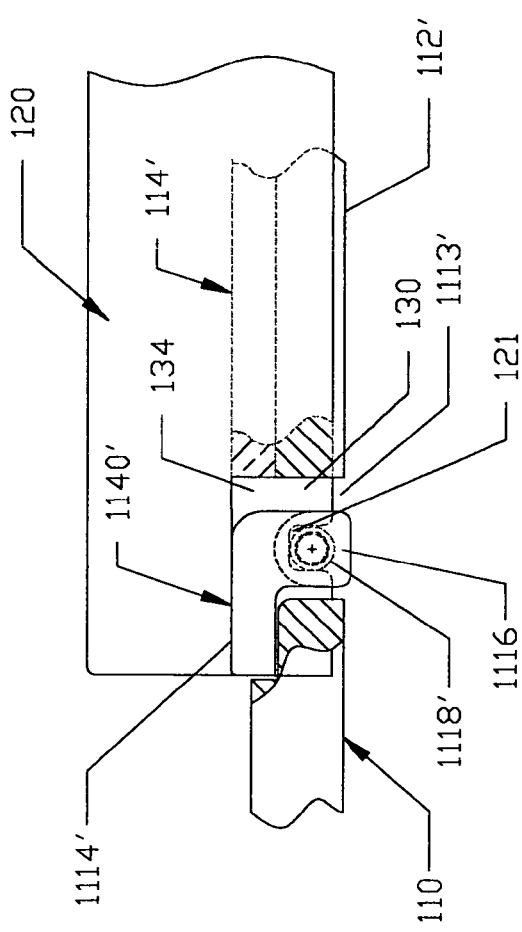
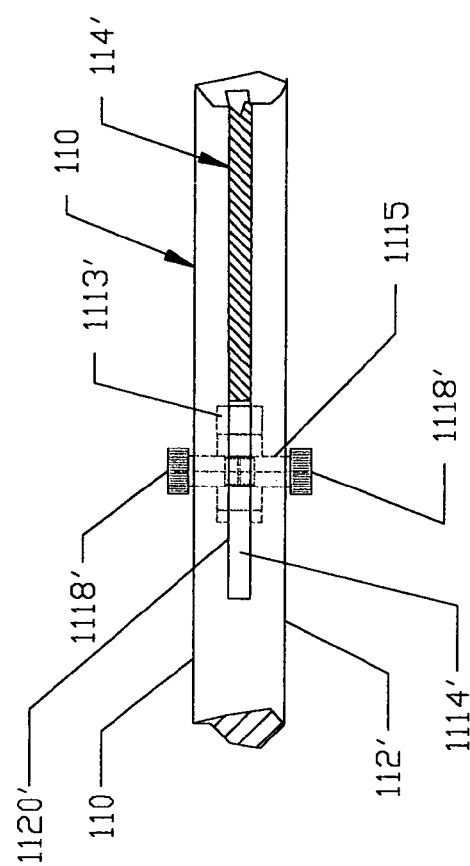

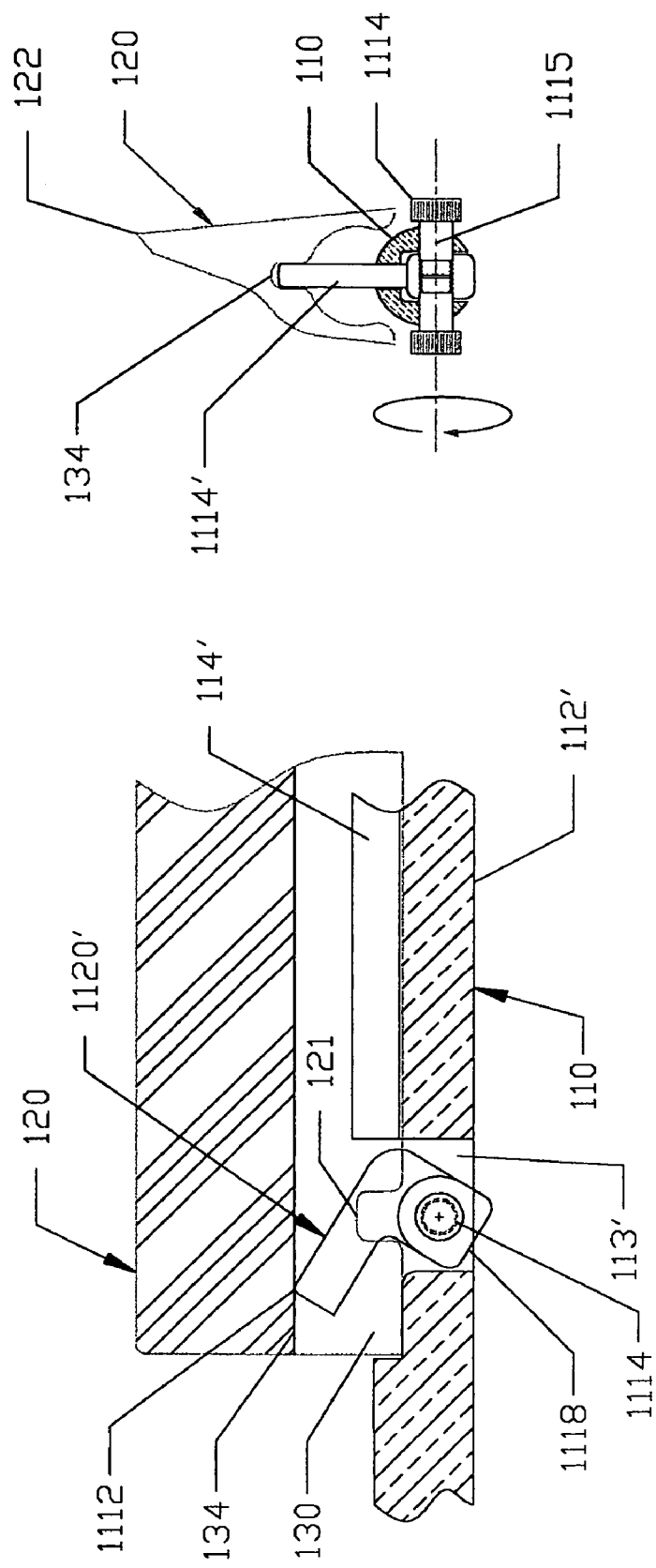

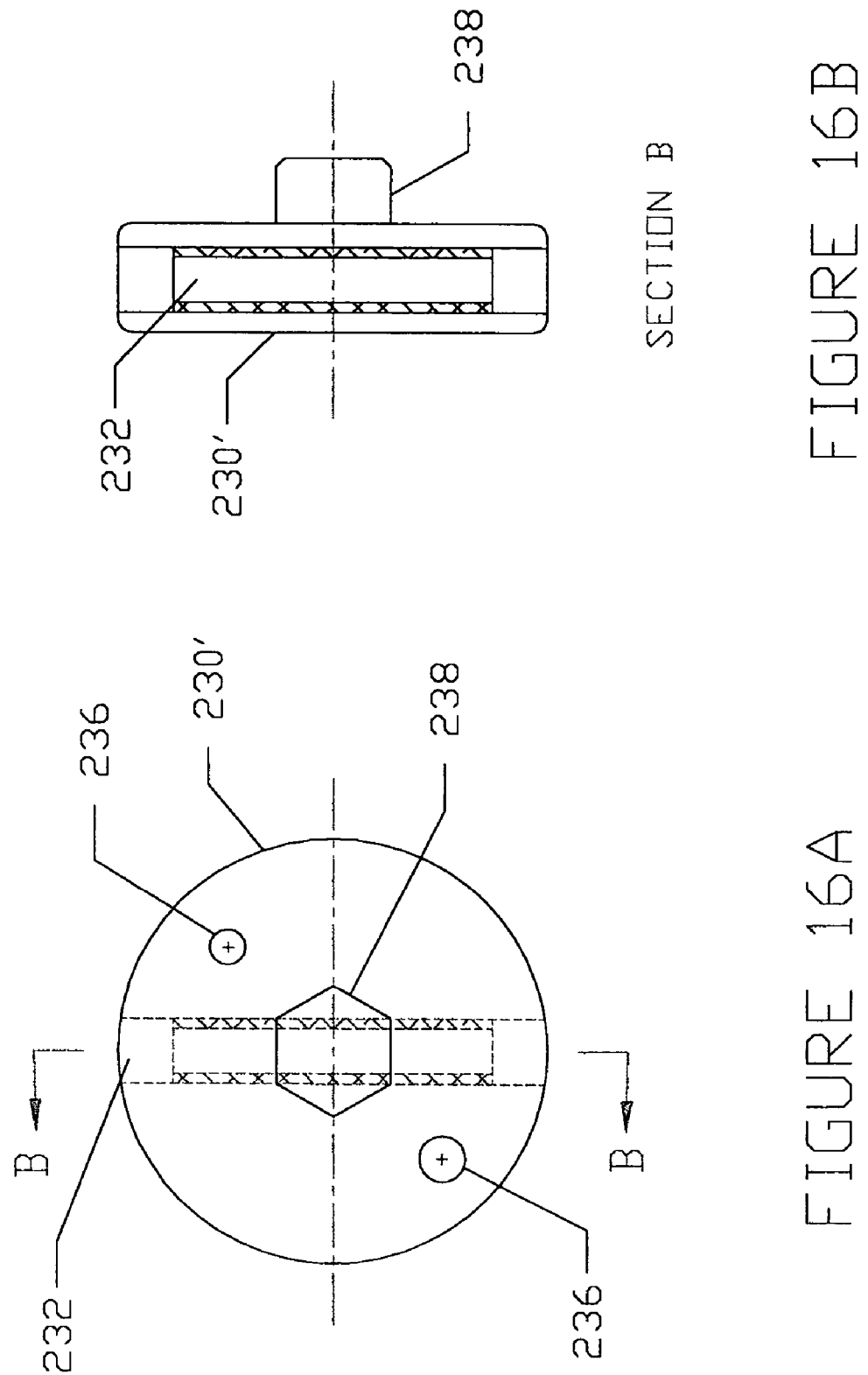

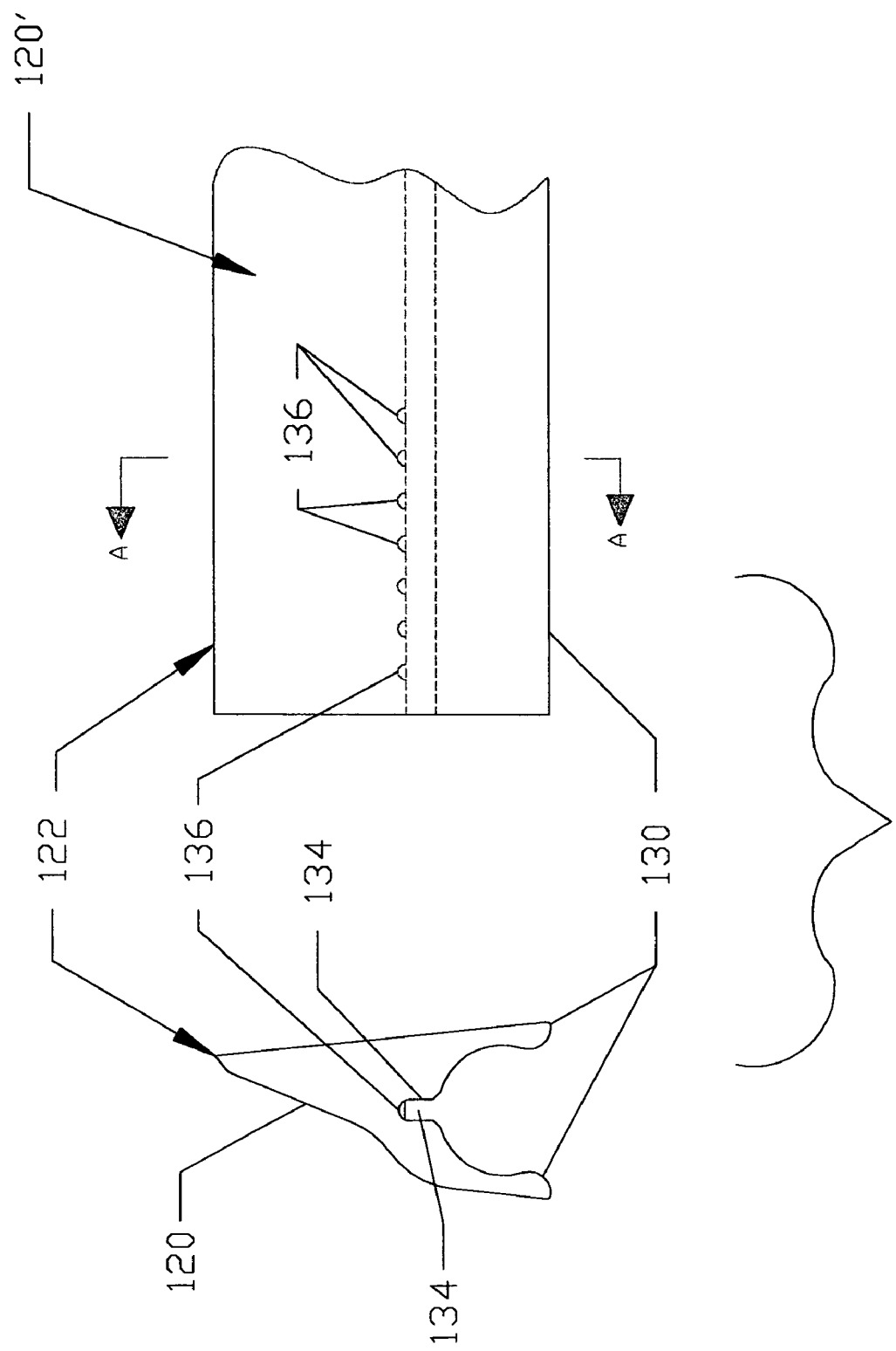

TENSIONER, AS FOR A BELT CLEANER

This Application is a division of U.S. patent application Ser. No. 09/808,657 filed Mar. 15, 2001 now U.S. Pat. No. 6,948,609, which claims the benefit of U.S. Provisional Application Ser. No. 60/191,554 filed Mar. 23, 2000, and of U.S. Provisional Application Ser. No. 60/247,520 filed Nov. 9, 2000.

FIELD OF THE INVENTION

The present invention relates to a tensioner and, in particular, to a torsional tensioner.

BACKGROUND OF THE INVENTION

Scraper-blade type belt cleaners as applied to light-duty belt conveyance systems are usually composed of little more than a piece of plastic sheet stock, typically polyethylene, that has been machined to have an angled edge. The machined edge serves as a belt scraper when held in proximity to or against the belt, typically by simple bolted angles, channels or other brackets, often in "one-of-a-kind" mounting arrangements. These belt cleaners are often located on a conveyor system near the location at which material is discharged from the conveyor belt (i.e., near the head or snub pulley). Since these belt cleaners rarely incorporate any type of blade tensioning system, regular adjustment of the mounting arrangement is required to maintain blade pressure against the belt for proper operation. Due to the difficulty in removing and re-installing the blade assembly when these mounting arrangements are used, sanitary cleaning operations are limited as a practical matter to In-Place Cleaning (IPC) techniques.

These "one-of-a-kind" belt cleaners are often designed specifically for particular existing equipment and are retrofit into such existing equipment by plant maintenance personnel, however, some Original Equipment Manufacturers (OEMs) do provide inexpensive cleaners with their conveyance systems that are likewise impractical for easy use. Moreover, OEM process equipment manufacturers will sometimes use a device similar to a belt cleaner to remove product from process rollers or to aid in directing the product carried by the conveyor (e.g., guide rails or flow directors) or in shaping the product (e.g., dough rounders)

Certain "few-of-a-kind" scraper blade type belt cleaners found on OEM designed conveyance systems and related process equipment incorporate a simple compression spring assembly or similar mechanism to permit tensioning of the scraper blade against the conveyor belt. These units are typically difficult, if not impossible, to properly clean and sanitize, and normal adjustment of the spring tension often requires special tools and skilled personnel. Further, small hardware or other parts often used on such systems are loosed or disassembled for cleaning and can easily find their way into the process stream. Due to the relative complexity of a spring assembly, such tensioned systems are seldom designed and retrofit to existing equipment by plant maintenance personnel.

One commercially available belt scraper that is purportedly configured specifically for food grade applications is the Piglet™ scraper, which is offered for both primary ("Pre-Cleaner") and secondary ("Post-Cleaner") scraper configurations. Elements of the this scraper that are both undesirable and unlike the present invention include:

an internal elastomeric tensioner and end-housing which, due to the inherent difficulty of disassembling and cleaning such an assembly and to the lack of adequate seals, presents a potentially serious microbiological hazard when used in food grade applications;

a tensioner system which is difficult to utilize in the field due to the need for hand-tool adjustment of the tension and the limited life of the set-screw type fasteners used to adjust the tension after each cleaning;

a removal and installation scheme that requires the scraper blade to be "slid" off the ends of the blade-holder, thus making regular disassembly and cleaning extremely difficult; and a segmented blade in which contaminating materials and moisture can easily become entrapped in spaces between the blade and blade holder, and between adjacent ones of the four-inch blade segments.

Further, another company offers a Saber® Belt Cleaner, which is not designed for sanitary/food grade applications, but is "upgraded" by offering a scraper blade fabricated from food-grade material. This system utilizes an incremental tensioning system, called the "Twister Tensioner", and utilizes a polyurethane torsion element. The tensioning unit is not a sanitary design and presents a potentially serious microbiological hazard because static material and moisture can accumulate between the Twister Tensioner and the blade holder tube. In addition, cleaning and/or inspecting this belt cleaner requires complete disassembly which creates a difficulty while exposing the processing line to loose hardware that can easily find its way into the product as foreign matter.

Finally, ASGCO Manufacturing offers a modified version of the Mini-Skalper™ scraper which is "upgraded" for sanitary/food-grade applications by offering both a food-grade scraper blade and by changing the blade holder and components of the Roto-Twist™ tensioner to stainless steel materials and construction.

Accordingly, there is a need for a belt scraping apparatus that is suitable for use in food-grade and/or other sanitary cleaning operations, although its use is not limited thereto. In addition, it would also be desirable that both the arrangement and materials thereof be suitable for use in a sanitary operation, including the arrangement and materials of the scraper blade, the blade holder, the blade tensioning mechanism and the system arrangement.

To this end, a tensioner includes an outer collar affixed to a housing, an inner collar affixed to a blade holder, and a torsion spring coupled between the inner and outer collars for urging a blade toward a belt.

BRIEF DESCRIPTION OF THE DRAWING

The detailed description of the preferred embodiments of the present invention will be more easily and better understood when read in conjunction with the FIGURES of the Drawing which include:

FIG. 11 is a schematic diagram illustrating removal of a snap-on blade using an exemplary L-shaped tool, in accordance with the invention, FIGS. 12A and 12B are side-view and top-view schematic diagrams, partially in cross-section, of an alternative exemplary blade-removal lever mechanism, FIGS. 13A and 13B are side-view and end-view cross-section schematic diagrams, respectively, of the blade-removal lever mechanism of FIGS. 12A–12D when fully actuated, FIGS. 16A and 16B are end-view and side-view cross-section schematic diagrams, respectively, of an alternative embodiment of an outer collar suitable for use in, for example, the tensioning arrangement of FIG. 4 or FIG. 15, FIGS. 17A and 17C are side-view schematic diagrams, respectively, of an exemplary alternative blade holder and a complementary alternative scraper blade therefor.

Figure 1:
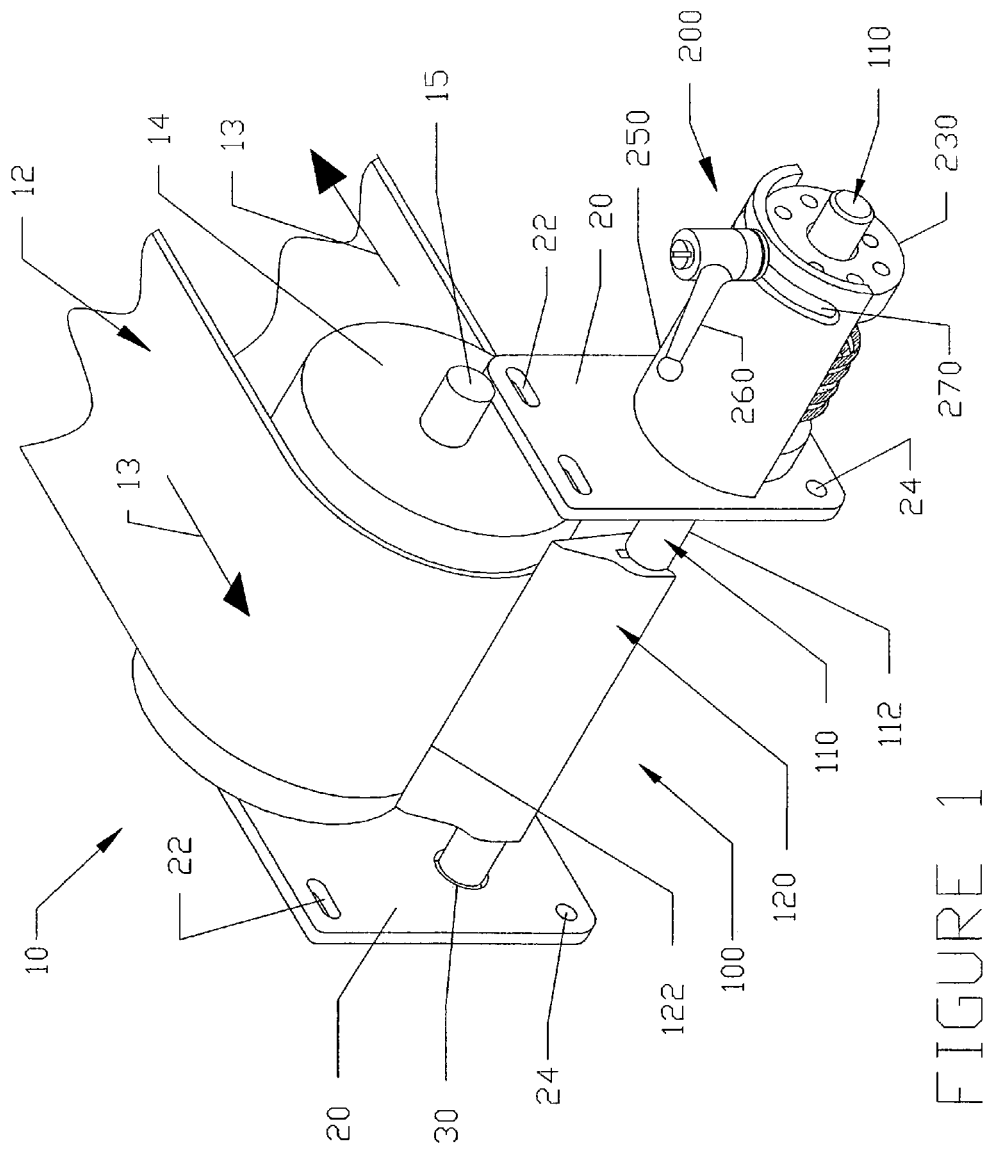
FIG. 1 is an isometric schematic diagram of an exemplary scraping system arrangement showing a head pulley and a conveyor belt, in accordance with the invention.

In the Drawing, where an element or feature is shown in more than one drawing figure, the same alphanumeric designation may be used to designate such element or feature in each figure, and where a closely related or modified element is shown in a figure, the same alphanumerical designation primed may be used to designate the modified element or feature. Similarly, similar elements or features may be designated by like alphanumeric designations in different figures of the Drawing and with similar nomenclature in the specification, but in the Drawing are preceded by digits unique to the embodiment described. For example, a particular element may be designated as "xx" in one figure, by "1xx" in another figure, by "2xx" in another figure, and so on. It is noted that, according to common practice, the various features of the drawing are not to scale, and the dimensions of the various features are arbitrarily expanded or reduced for clarity.

DESCRIPTION OF THE PREFERRED EMBODIMENTS

The invention disclosed herein utilizes a unique configuration and novel design elements to overcome a myriad of problems presented by prior art belt scrapers. In particular, the present invention addresses for the first time and fulfills the specific needs of food manufacturing and related industries where cleaning, inspection and sanitation are important, although the invention is not limited to such environments. The invention relates to a novel scraper apparatus adapted to facilitate the dislodgment of either process material or fugitive material from a conveyor belt or pulley by bearing directly upon the belt or the pulley, as the case may be.

The arrangement of the present invention addresses the many shortcomings of conventional scraper-type material dislodgment devices used in food processing today, and provides a unique system that seeks to overcome the shortfalls of conventional prior art systems. As previously described in the background section hereof, many deficiencies exist with conventional cleaning systems that are either retrofit to in-place equipment by plant personnel, are provided by OEM process equipment manufacturers, or are merely so-called "upgrades" of belt cleaners which are actually designed for heavy duty ("black-belt") applications rather than for food processing and other sanitation-sensitive applications.

The invention is a novel cleaning system that utilizes a unique scraper blade 120, blade holder 110, tensioning mechanism 200, and system 10 configuration to facilitate the dislodgment of fugitive or in-process materials from a conveyor belt 12 or similar equipment. This cleaning system 10 is particularly suited for, but not limited to, use on conveyance systems that have light-duty or "European-style" belts 12, or thermoplastic belts 12, or segmented modular plastic belts 12, with typical belt-widths ranging from several centimeters to several meters, e.g., from 4–118 inches (about 10–300 cm). Tensioner 200 typically provides for tension adjustment of sufficient precision for use with easily damaged belts 12 such as those with soft covers such as silicone or polyolefin.

Additionally, cleaning system 10 is designed and configured, and uses certain unique mechanisms, to meet the most stringent sanitary design requirements of the food manufacturing industry as well as similar requirements from industries where concern exists for foreign material and microbiological contamination, clean-ability and inspect-ability, exclusion of loose parts (such as nuts, bolts and other hardware) from the zone in which product is processed (e.g., the product zone), operation by low-skill labor, and/or similar requirements. Overall, the invention utilizes at least four significant design elements that are patentable, individually and collectively. As a whole, the inventive system 10 significantly advances the art of material dislodgment, and, we believe, for the first time addresses and fulfills the specific needs of food manufacturing and related industries.

Figure 2:
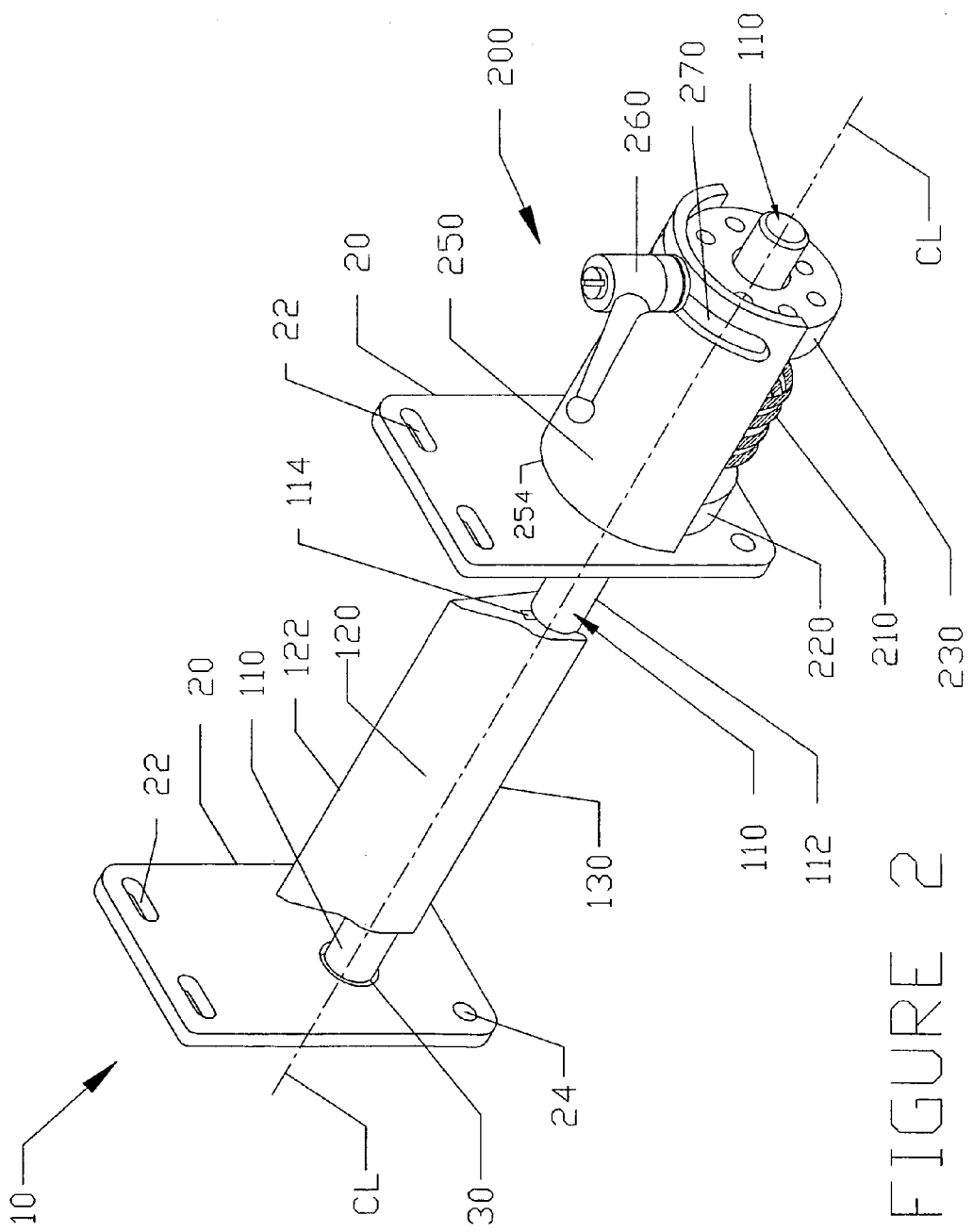
FIG. 2 is an enlarged isometric schematic diagram of the scraping system arrangement of FIG. 1 in accordance with the invention.
Figure 3:
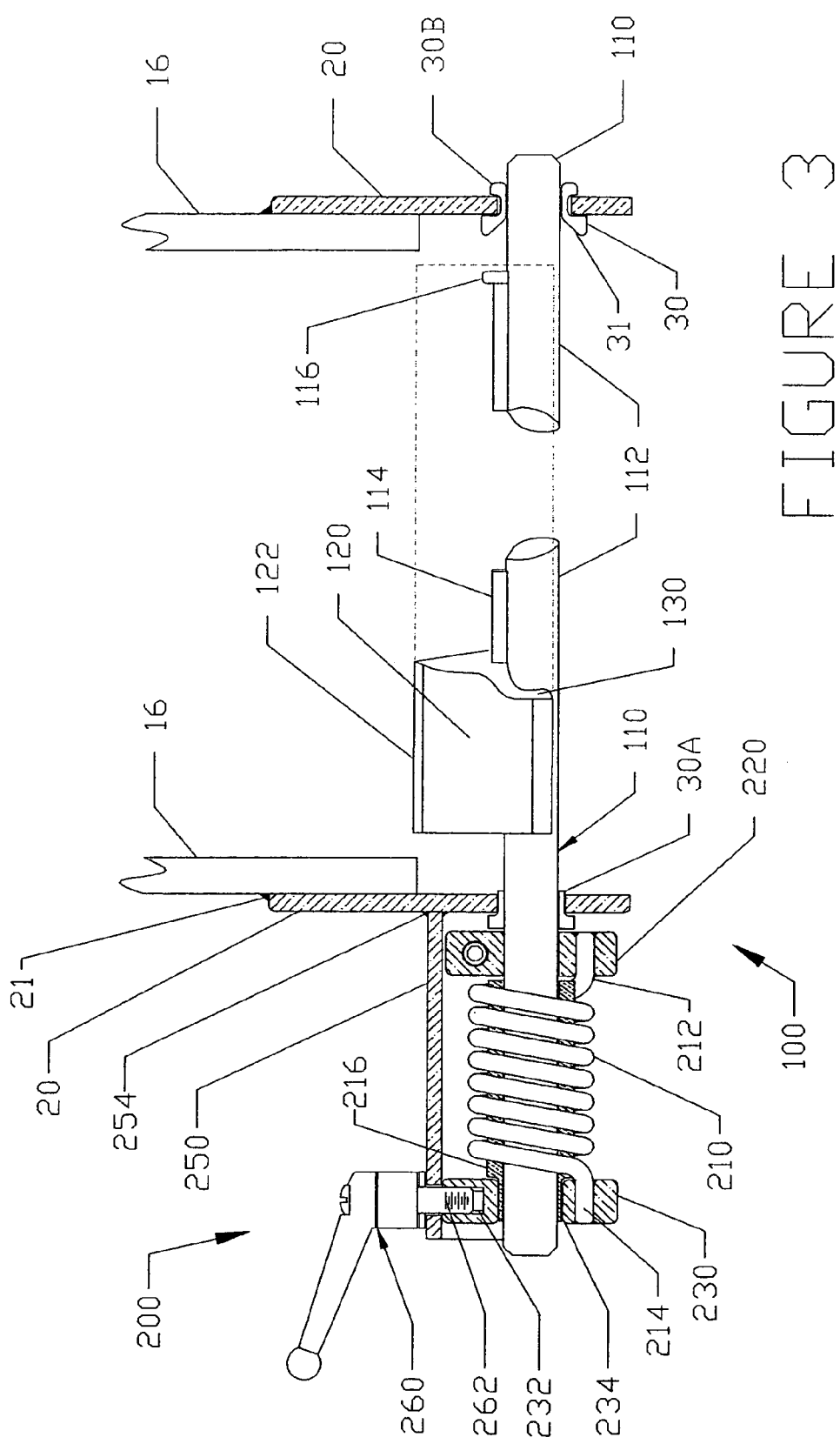
FIG. 3 is a schematic diagram, including a partial section, showing the scraping system of FIG. 1 viewed looking toward the conveyor belt.

The conveyor and scraping system 10 of the present invention is generally described in relation to FIGS. 1, 2 and 3 in which FIG. 1 is an isometric schematic diagram of an exemplary scraping system arrangement 10 showing a head pulley 14 and a conveyor belt 12, in accordance with the invention, FIG. 2 is an enlarged isometric schematic diagram of the scraping system arrangement 10 of FIG. 1 in accordance with the invention, FIG. 3 is a schematic diagram, including a partial section, showing the scraping system 10 of FIG. 1 viewed looking toward the conveyor belt 12.

The general operation of a belt scraper and conveyor system 10 is well understood and is described in great detail, for example, in several earlier patents issued to George Mott, et al., such as U.S. Pat. Nos. 5,992,614, 5,887,702 and 6,152,290. The operation of the inventive belt scraper system 10 in relation to a conveyor belt 12 moving in a direction 13 over a primary driving or powered (head) pulley 14 rotatable about axle 15 is generally similar to other scraper type belt cleaners, however, the inventive scraping system 10 comprises a novel scraper blade assembly 100 including novel scraper blade 120 which mechanically dislodges material from the conveyor belt 12; a novel blade holder 110 that supports and locates the scraper blade 120, and a novel adjustable tensioning system 200 that, among other functions, acts to force the tip or scraping edge 122 of scraper blade 120 against the conveyor belt 12.

Scraper blade 120 is mounted to blade holder 110 and is constrained by key bar 114 to rotate with blade holder rod 112 which is rotatably mounted to and is supported at each end by holes 28 of mounting plates 20 that are normally rigidly affixed to members of the frame 16 of a conveyor system. Mounting plates 20 are mounted to conveyor frame 16 either by welding 21 or by fasteners (not shown) through the provided clearance holes 22, 24, which may be circular 24 or may be slotted 22 to allow positional adjustment. Typically, an optional bushing or bearing 30 may be disposed in the hole 28 in mounting plate 20 through which blade holder rod 112 passes. On the tensioner 200 side of the system 100, mounting plate 20 includes a half-can housing 250 that is rigidly affixed to the mounting plate 20 such as by welding, e.g., weld 254. The centerline CL of half-can housing 250, which is preferably a section of a hollow cylinder, corresponds to the centerline CL of blade-holder 110, i.e. the CL of rod 112. A clamp 260 releasably fixes the position of outer collar or flange 230 with respect to half-can housing 250. For example, outer collar 230 has a radially-located threaded hole 232, (most desirably a thru hole for sanitary purposes), that accepts a threaded stud 262 which is part of position-adjustable tension-locking handle 260. Threaded stud 262 passes through the circumferential slot 270 provided in half-can housing 250 as it engages threaded hole 232 on outer flange/collar 230, so as to clamp collar 230 and half-can housing 250 when tightened.

A metallic helix-shaped torsion spring 210 serves as the primary torsioning element for rotatably urging blade edge or tip 122 of blade 120 to bear against belt 12. Torsion spring 210 is rigidly affixed at respective ends 212, 214 to "inner" collar 220 and to "outer" collar 230, both of which are co-linearly located at one end of blade holder rod 112. Inner collar 220 is rigidly clamped or other wise attached to blade holder rod 112 so as to rotate therewith. Outer collar 230 is not directly affixed to blade holder 112, but is radially constrained by circumferentially located half cylinder referred to as "Half-Can Housing" 250 and by central circular bore or clearance hole 234 through which blade holder rod 112 passes. Half-can housing 250 is positioned over, i.e. above, tension spring 210 to also serve as a shield to block falling material from landing on spring 210 and collars 220, 230. Preferably, half-can housing 250 is about one-half of a cylinder, but may be between about ⅓ and ⅔ of a cylinder.

When the blade/blade holder assembly 120/100 is rotated to where it is held against the belt 12 surface, proper rotation of tension-locking handle 260 in the aforementioned half-can housing 250 slot 270 acts to increase (or decrease) the tension in torsion spring 210, thereby increasing (or decreasing) the applied pressure of the blade 120 against conveyor belt 12. Tension-locking handle 260 acts, when tightened, to clamp outer collar 230 to half-can housing 250 at any of an essentially infinite number of set-able locations along slot 270, thereby applying and maintaining a precisely applied tension of torsion spring 210 to blade 120. This unique arrangement allows for precision set-ability of the tension (i.e. blade 120 pressure against belt 12), which is a crucial requirement for the light-duty belt industry where expensive soft covered belts 12 are rapidly destroyed by excessive tension applied by belt cleaning systems that lack precise tension set-ability.

Half-can housing 250 rigidly anchors the outer collar 230 (via the tightening of the tension-locking handle 260) with respect to mounting plates 20 and fixed conveyor frame 16. Half-can housing 250, which is disposed above torsion spring 210 and collars 220 and 230, uniquely enables both the direct tensioning of blade 120 during spring 210 adjustment and acts as a protective cover to prevent accumulation of food and other contaminating materials in and around tensioning system (tensioner) 200.

Scraper blade 120 is unique in both geometry and in the means by which it can easily be attached to and removed from blade holder 110. In the food manufacturing industry, for example, both regulatory and good manufacturing practices often mandate the regular cleaning and sanitation of equipment and devices in and around the product zone, i.e. the regions in which food is processed. In certain industries (e.g., meat and poultry processing), the cleaning of devices and equipment that comes into contact with food is performed at least once per work shift. Ease of disassembly and access for "In-place Cleaning" (IPC, i.e. cleaning of equipment in the location where it is used) and "Cleaning Out-of Place" (COP, i.e. cleaning in a location other than where the equipment is used) cleaning operations are essential design features of devices like belt cleaners. The novel "snap-on" blade 120 (actually a "snap-on/snap-off" blade) facilitates rapid and easy installation and removal of the plastic blade 120 from the metallic blade holder 110 while completely eliminating loose hardware (such as detent pins, nuts and bolts) that could contaminate the food being processed. In many cases, installation and removal of blade 120 may be accomplished without the need for hand tools.

Snap-on/snap-off blade 120 is fabricated from any of a variety of pliable elastomeric/plastic materials including food and non-food grade polyethylene, polyurethane, polypropylene, polyvinyl-chloride (PVC), PTFE (Teflon™), nylon, oil-filled UHMW-PE (ultra-high molecular weight polyethylene), Delrin®. Hytrel®, and other suitable materials. The snap-on installation of blade 120 typically requires hand-force only and is achieved by elastically deforming (i.e., spreading) the "legs" 130 of blade 120 as they engage blade holder rod 112 and key-bar 114. For each of the materials of construction mentioned, the geometry of legs 130 is modified, e.g., in thickness and/or shape, to facilitate the snap-on feature, while consideration is also given to ensure a service life of several thousand cycles.

Additionally, the close tolerance (circumferential) fit of scraper blade 120 and blade holder rod 112 prevents the static accumulation of food or foreign materials at or in this interface therebetween. This feature is enhanced by design by permitting a residual elastic (clamping) force to remain in legs 130 of blade 120 as they reach their fully-engaged position on blade holder rod 112. Another novel and inherent attribute of blade legs 130 is their ability to function as "skirts", enhancing the shedding of material from the sides of blade 120 while impeding material build-up on blade holder 110. Longitudinal motion of blade 120 along blade holder 110 is restricted by a radially oriented extending fixed pin 116 (or similar feature) affixed to the blade holder so that it engages a feature, such as an end or a recess, on scraper blade 120.

An entire "family" of snap-engageable blades of different lengths transverse to belt 12 to accommodate different width belts 12 and of different heights between skirts or legs 130 and blade edge 122 is obtainable by simply modifying the geometry, scale, and materials of blade 120 and/or blade holder 110. For example, key-bar 114 could be incorporated into the geometry of scraper blade 120 and a mating female geometry such as a slot (instead of male) could be located on blade holder 110. For brevity, this inherent capability is only noted and is not described further herein.

An optional element of the invention is the inclusion of three optional bushings, best illustrated, for example, in FIG. 3, as spring bushing 216 and rod bushings 30A, 30B. Spring bushing 216 is located between blade holder rod 112 and torsion spring 210 and extends through hole 234 in outer collar 230 and provides a smooth bearing surface for outer collar 230 and spring 210 to rotate upon. Bushing 216 also helps to keep material, e.g., food, contaminants and other foreign matter, away from the circumferential crevice volume between outer collar 230 and blade holder rod 112 at their interface at hole 234, and it prevents materials from lodging between spring 210 and blade holder 110. Optional cylindrical bushing 216 serves to maintain the relative position of torsion spring 210 with respect to blade holder rod 112 where blade holder 110 passes through the central opening of spring 210. Bushing 216 has an outer diameter that permits it to be inserted within spring 210 and has an inner diameter that provides clearance for blade holder rod 112 to pass therethrough. In addition, optional bushing 216 may include an extension of lesser outer diameter that extends through clearance hole 234 in outer collar 230 for limiting the relative displacement of the central axis of collar 230 with respect to that of blade holder rod 112. Cylindrical bushing 216 may include only the portion within torsion spring 210, only the portion within clearance hole 234, or both, and may be fabricated as one piece or in several pieces.

Rod bushing 30A is located on the tensioner 200 side of conveyor 10 between inner collar 220 and mounting plate 50 and preferably is a shouldered bushing that extends into the bearing surface region between mounting plate 20 and blade holder rod 112. Bushing 30A provides a smooth bearing surface for both the blade holder 110 to mounting plate 20 interface and for the inner collar 220 to mounting plate 20 face surfaces. Bushing 30A also prevents material from entering tensioner 200 from through hole 28 in mounting plate 20, and it prevents material from lodging between inner collar 220 and mounting plate 20. Rod bushing 30B is located on mounting plate 20 on the side opposite tensioner 200 and is of a unique, conical, one-time use, snap-in-place design. Bushing 30B provides a smooth bearing surface for the blade holder 110 to mounting plate 20 interface. A feature of bushing 30B is a short funnel shaped appurtenance feature 31 oriented with its opening facing toward the center of conveyor 12 and co-linear, i.e. co-axial, with blade holder rod 112. This specialized funnel 31 aids in guiding the installation of blade holder rod 112 into mounting plate 20 at installation or following a system level cleaning operation. Note that none of these bushings 30A, 30B and 216 are required to achieve a fully functional system, and in fact their removal is recommended for certain ultra-sanitary installations.

Figure 4:
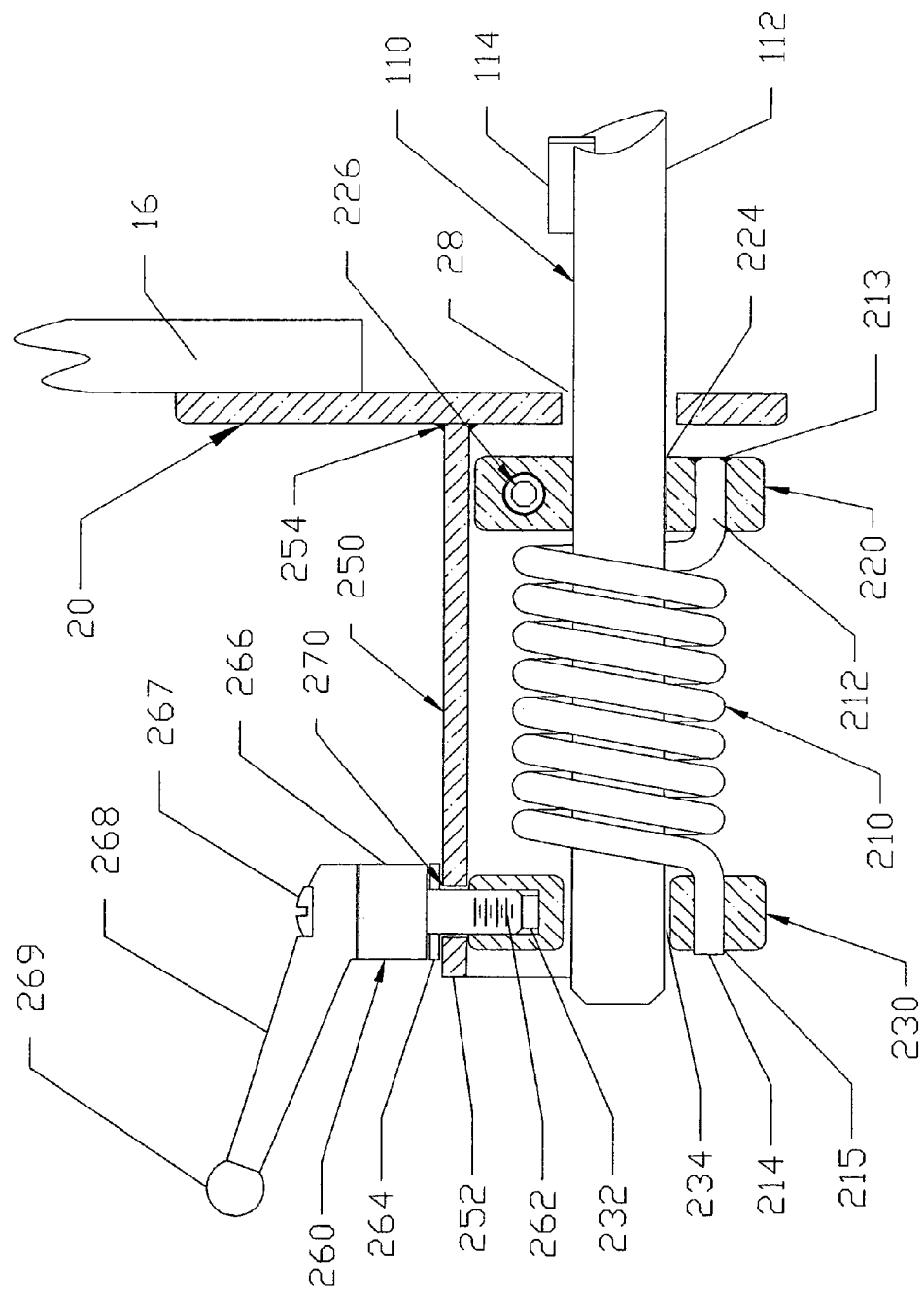
FIG. 4 is a cross-section schematic diagram showing the tensioning arrangement of the system of FIG. 1.
Figure 5:
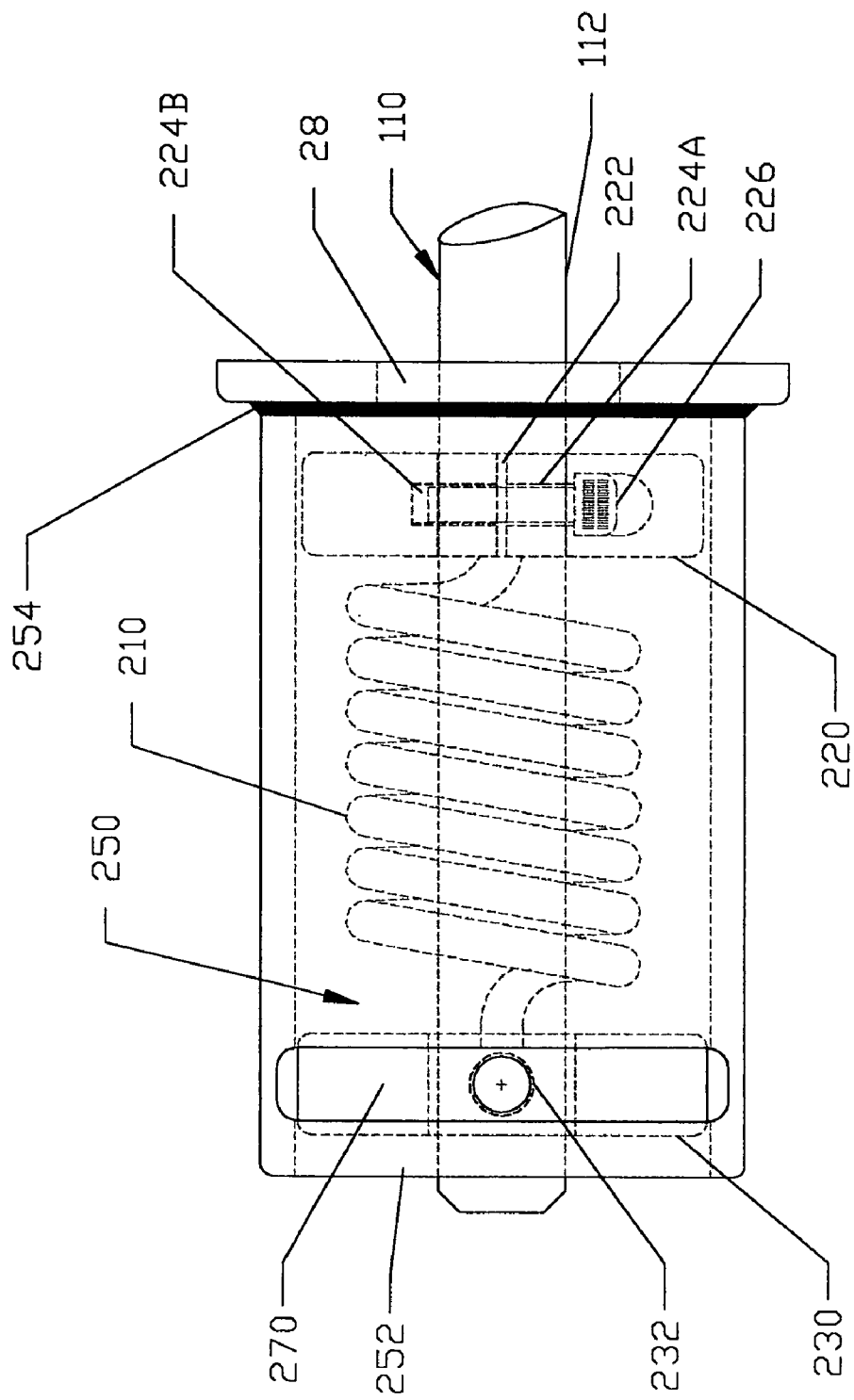
FIG. 5 is a top-view schematic diagram showing the tensioning arrangement of the system of FIG. 1, with the locking handle removed for clarity.
Figure 6:
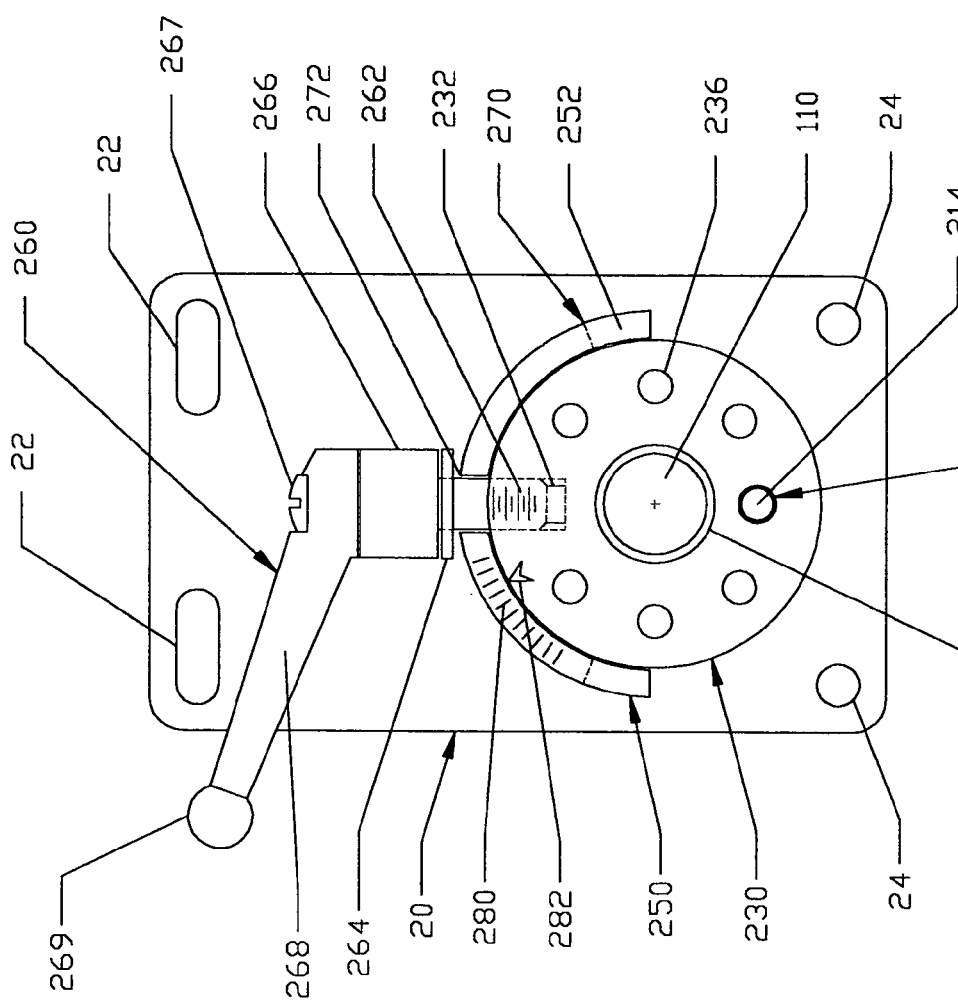
FIG. 6 is an end-view schematic diagram showing the tensioning arrangement of the system of FIG. 1.
Figure 7:
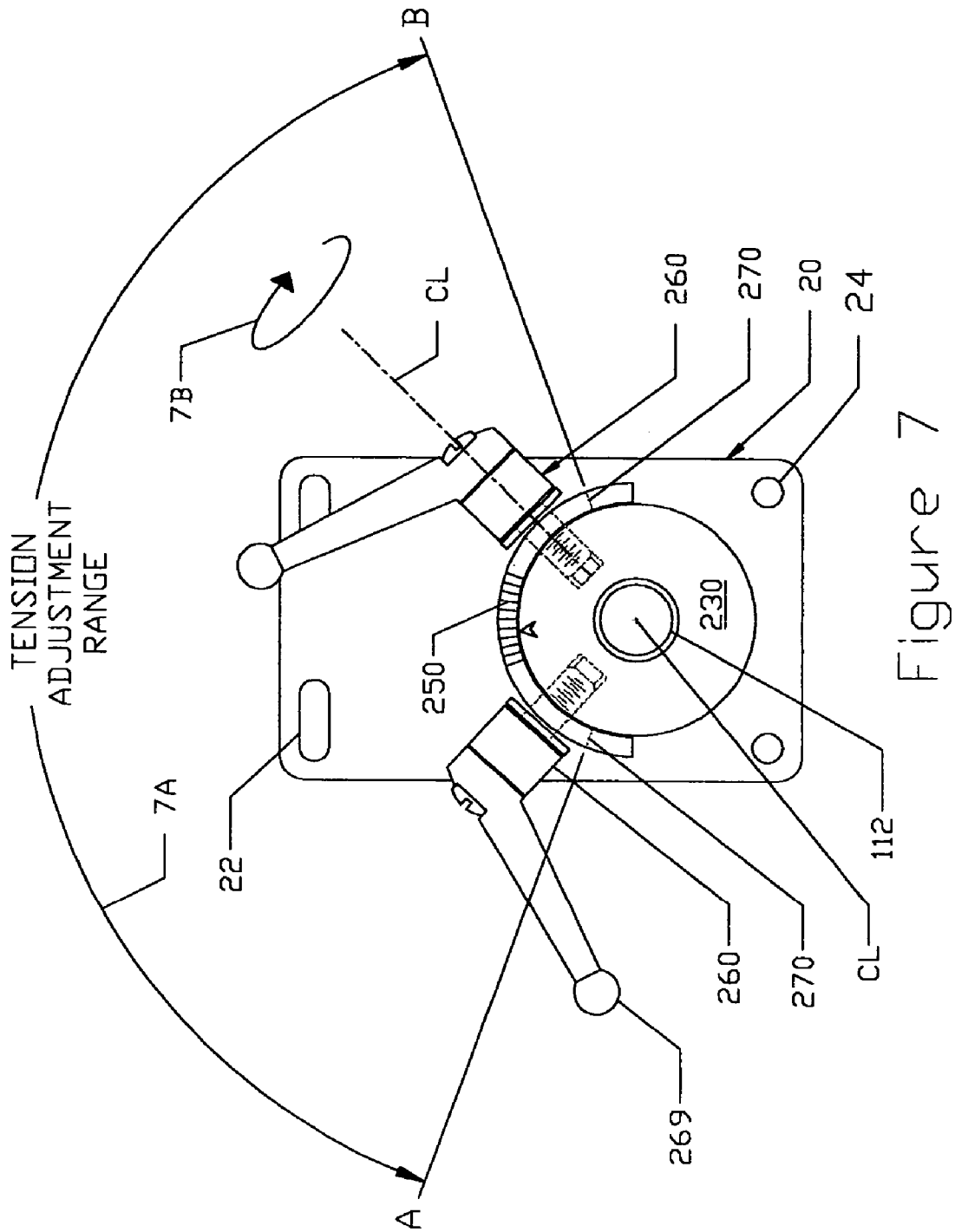
FIG. 7 is an end-view schematic diagram illustrating the tensioning adjustment arrangement of the system of FIG. 1, FIGS. 8A, 8B and 8C are side-view, end-view and cross-section view schematic diagrams, respectively, of an exemplary tension adjustment tool suitable for use with the system of FIG. 1.

Tensioning arrangement 200 for scraper blade 120 is described in relation to FIGS. 4 through 7 in which FIG. 4 is a cross-section schematic diagram, FIG. 5 is a top-view schematic diagram (with the locking handle 260 removed for clarity), and FIG. 6 is an end-view schematic diagram showing tensioning arrangement 200 of belt cleaning system 10 of FIG. 1, and FIG. 7 is an end-view schematic diagram illustrating the tensioning adjustment arrangement of system 10 of FIG. 1. In this arrangement, optional bushings 30, 216 are omitted.

The torsion spring 210 component of tensioning system 200 is located about the end of rod 112 of blade holder 110. Typically, spring 210 is rigidly affixed by welding 213, 215, or other means, to one or both of the collars 220 and 230, however, ends 212, 214 of torsion spring 210 need not be so attached, but may be unsecuredly disposed in one of through holes 236. While only one hole 236 is necessary to receive the end 214 of torsion spring 210, a plurality of through holes 236 is typically provided disposed in a circular arrangement of convenient diameter concentric with hole 234. Where an adjustment tool is to be utilized, as described below, holes 236 are preferably in pairs disposed 180° apart around the circle for receiving pins of the adjustment tool. Outer collar 230 is provided with a centrally located clearance hole 234 which permits rotation of outer collar 230 about the central axis CL of blade holder rod 112. Inner collar 220 is, for example, a split-collar which provides a clamping action of collar 220 to rod 112, which passes through hole 224A to engage threads in hole 224B, when a fastener 226, such as a socket-head cap screw, is advanced by turning to close radial slot 222. This clamping action is sufficient to affix both the rotational and longitudinal position of inner collar 220 along blade holder rod 112.

The rotational and longitudinal position of the inner collar 220 on rod 112 of blade holder 110 necessarily varies for each installation depending upon the desired rotation and longitudinal position of scraper blade 120, manufacturing variances and tolerances in spring 210, and upon whether a spring 210 with a left-handed or right-handed twist is used. Typically, during initial installation of cleaner system 10, inner collar 220 is "permanently" clamped to rod 112 of blade holder 110 in a determined location, seldom, if ever, requiring adjustment or re-positioning thereafter. When inner collar 220 is properly located, threaded radial hole 232 in outer collar 230 will be accessible and centered on the circumferential slot 270 located near distal end 252 of half-can housing 250.

Half-can housing 250 is rigidly affixed, e.g., by welding 254 to mounting plate 20 which is rigidly affixed to the conveyor system 10 frame 16 or to another support or structure, for example, either by welding or by utilizing fasteners through the provided thru-holes 24 and thru-slots 22. Tension-locking handle 260 has a threaded stud 262 protruding from shouldered shank 266, which threaded stud 262 engages into threaded hole 232 of outer collar 230 after passing through slot 270 in half can housing 250. The end of threaded stud 262 proximate shank 266 is preferably not threaded so as to provide a smooth bearing surface at the interface between half can housing 250 and stud 262 at circumferential slot 270. Handle portion 268 of tension locking handle 260 extends radially or at an angle with respect to shank 266 and stud 262, and may also have a grip such as ball knob 269 of spherical or other shape, for convenient gripping. Handle 260 may be of unitary construction or may be fabricated in two or more pieces and fastened together, e.g., by a screw or bolt 267.

By rotating tension-locking handle 260 (i.e. tightened, as shown by arrow 7B in FIG. 7), a clamping action occurs between outer collar or flange 230 and the inner surface of half-can housing 250. When tension-locking handle 260 has been sufficiently loosened, thereby relieving the clamping action between outer collar 230 and half-can housing 250, the outer collar 230 is released to be able to rotate about the central axis CL of blade holder rod 112 over a tension adjustment range (as illustrated by arrow 7A of FIG. 7). Locking handle 260 is movable to and is lockable at any angular position between positions A and B at the opposite ends of slot 270, thus inducing a torsional force on the spring 210. When properly applied, this torsional force is transferred from spring 210 through inner collar 220, blade holder rod 112, and key-bar 114 to scraper blade 120 which is positioned against the conveyor belt 12 or similar surface. Locking handle 260 is positioned and secured in the position within the tension adjustment range (illustrated by arrow 7A) that provides the desired force urging blade edge 122 of blade 120 against conveyor 12. The tension of spring 210 is secured by rotating (arrow 7B) tension-locking handle 260 until a sufficient clamping force is achieved to prevent further rotation between outer collar 230 and half-can housing 250. Tensioning is essentially infinitely selectable over the range illustrated by arrow 7A, i.e. is continuously adjustable in that there are no fixed adjustment increments and handle 260 may be secured at any desired angular rotation. In one typical embodiment, slot 270 has a length that provides about 120° total adjustment range, however, about 60° adjustment is typically provided in each direction away from center position, which is where an axial slot 272 (shown in phantom) is preferably located, as more particularly shown and described in relation to FIG. 14 below. The direction (i.e. clockwise or counter-clockwise) in which handle 260 is moved with respect to slot 270 for adjustment in any particular application of tensioning system 200 typically depends upon which side of conveyor 12 that tensioner 200 is mounted. These features are particularly desirable as applied to light duty belts. Typical applications and tensioner parameters, such as tensioner spring rates, are set forth in the Table below:

Preferably, the outer diameter of collar 230 is preferably about the same as the inner diameter of the cylinder defining half-can housing 250, and inner collar 220 is preferably of lesser diameter. Thus, when locking handle 260 is tightened, outer collar 230 is held snug against the inner surface of half-can housing 250 and is accurately positioned with respect thereto, thereby also fixing the relative positions of blade holder rod 112 and end 214 of torsion spring 210. Because half-can housing 250 is likewise accurately positioned and attached to mounting plate 20, it is accurately positioned with respect to hole 28 in mounting plate 20, and bushing 30 therein, if utilized. As a result, all of torsion spring 210, inner collar 220, outer collar, half-can 250 and mounting plate 20, and the respective holes therein, are fixed in predetermined relative positions that properly align with blade holder rod 112 to within desired tolerances.

Arcuate half-can housing 250 is affixed to and extends from mounting plate 20 and is arcuate about an axis intersecting mounting plate 20 proximate hole 28 therein, and is preferably a cylinder whose central axis intersects hole 28. Outer collar 230 is spaced away from mounting plate 20 and has an arcuate edge complementary to arcuate housing 250 and is rotatable with respect to arcuate housing 250 about an axis substantially intersecting hole 28, but which may be misaligned therefrom. Inner collar 220 is rotatably disposed between outer collar 230 and mounting plate 20 and has a through hole 224 adapted for receiving a member such as blade holder rod 112 and is rotatable about an axis substantially intersecting hole 28, but which may be misaligned therefrom.

Disassembly of blade assembly 100 including blade holder 110, blade 120 and tensioner 200 is easily accomplished by loosening and removing locking handle 260, removing blade 120, and then extracting blade holder 110, spring 210 and collars 220, 230 from mounting plates 20 by moving them away from conveyor 12. This easy and convenient disassembly obtains whether ends 212, 214 of spring 210 are affixed to collars 220, 230 or are removably disposed therein. Removal of bushing 30B provides sufficient clearance for key-bar 114 to pass through hole 28 of mounting plate 20, but if such bushing is not utilized, then a radial slot in hole 28 is provided to allow release of rod 112 with key-bar 114 therein. Alternatively, bushing 30B may be sufficiently large to pass blade holder 110 therethrough or may be easily removable along with blade holder 110. Installation/assembly of blade apparatus 100 follows the reverse of the foregoing.

Vibration in belt cleaner 100 may cause tension-locking handle 260 to loosen and release during operation, thereby causing an undesired change, i.e. reduction, in the pressure of scraper blade 120 against belt 12. To prevent this from

| Application | Blade Width | Tension Spring Rate | Torque Range (Design) | Angular Adjustment |
|---|---|---|---|---|
| Light Duty | <44 inches (<112 cm) | 0.96 in-lb/deg. (1.11 kg-cm/deg.) | 0–60 in-lb (0–69.2 kg-cm) | ±60° = 120° |
| Heavy Duty | 44–96 inches (112–244 cm) | 3.0 in-lb/deg. (3.46 kg-cm/deg.) | 0–180 in-lb (0–207 kg-cm) | ±60° = 120° |
| Extra-Heavy Duty | 96–120 inches (244–305 cm) | 6.0 in-lb/deg. (6.92 kg-cm/deg.) | 0–360 in-lb (0–415 kg-cm) | ±60° = 120° |

Typically, scrapers of greater than about 79 inch width (about 200 cm) utilize two tensioners 200, one at each end of blade holder rod 112.

occurring, an optional anti-vibration or locking device, such as Belleville washer 264 or other locking-type washer or device, is used on tension-locking handle 260 between the shoulder of shouldered shank 266 and the outer surface of half-can housing 250. Additionally, tension-locking handle 260 has a position adjustable feature that allows the rotational position of handle 260 to be adjusted, i.e. rotationally with respect to shank 266 and threaded stud 262, without affecting the already applied clamping force. This feature is important for safety purposes (i.e. handle 260 won't "stick-out" from the side of the conveyor 10 in a direction away from mounting plate 20) and where a limited clearance exists which prevents full 360° rotation of handle 260 when it is being tightened or loosened. Tension locking handle 260 also has a ball knob 269 to improve hand grip and prevent hand-slipping, a common problem in the food industry where workers often have wet and slippery hands.

The present invention includes improvements to the ASGCO RotoTwist™ torsion spring tensioning system described in U.S. Pat. Nos. 5,201,402 and 5,992,614 and various embodiments may provide one or more of the following features and/or advantages:

(1) infinite set-ability of the spring tension (non-discreet continuous adjustment of tension rather that only discreet set points) over the entire operating range,
(2) single-handed setting (by one person) of the spring and blade tension without requiring the use of hand tools or a second person,
(3) direct and simultaneous tensioning of the tension spring and blade,
(4) a torque-limiting device that prevents the under-tightening or over-tightening of the tension-locking clamp handle,
(5) precise and repeatable tensioning of the tension spring and blade using a torque wrench, with and without a specialized tool,
(6) design and configuration to meet the most stringent sanitary design and cleanability requirements (especially through the use of an open external spring tensioning device which is accessible and easily sanitized),
(7) a "half-can" protective housing that greatly reduces or prevents the deposit and/or accumulation of static materials upon the tensioning unit while simultaneously providing a means for rigidly fixing the outer portion of the spring tensioner to the conveyor frame, and
(8) a unitary tensioner (tension spring and inner and outer collars) and blade holder that is quickly and easily removable as a unit from the mounting plates and half-can housing, such as for cleaning; and
(9) a graduated scale on the half-can housing associated with an index feature on the outer collar that indicates the relative rotation of the tensioning unit, from which the applied pressure of the scraper blade against the conveyor belt can be inferred or estimated.

In addition, the invention facilitates an IPC cleaning operation. Many conveyance systems and related equipment used, for example, in the food industry are cleaned on a regular (e.g., daily) basis utilizing IPC techniques. IPC cleaning often involves the use of high pressure spray washers, various hand brushes, and ideally involves a minimized amount of in-place disassembly. The unique "open-architecture" (accessibility) of the system according to the invention makes it particularly amenable to effective and convenient IPC type cleaning. Four elements contribute to and/or cooperate to provide this feature, First, the snap-on blade is easily removed, cleaned, and reinstalled. Second, the half-can housing and open-helix torsion spring allow the tensioning system to be effectively flushed by the pressurized spray. Third, the elimination of set-screws, blind holes, unsealed crevices and other material entrapment volumes, which are commonly found on other commercially available conveyors, enables IPC to be recommended. Finally, the re-tensioning of the system is easily and rapidly accomplished without requiring hand-tools. For a belt scraping/cleaning system contemplated for use in this manner with IPC cleaning, removal of the spring and blade holder rod bushings is preferred (this is permissible and does not adversely affect functionality, particularly where the spring is welded to the inner and outer collars and/or where the holes in the mounting plates for the blade holder rod are sized for use without bushings.

For certain, albeit rare, applications in which the most severe cleaning and/or sanitation requirements are imposed, i.e COP cleaning at frequent intervals, the inventive belt cleaner system is rapidly extracted from its mounting supports without requiring the use of hand tools. This facilitates, for example, submersive COP cleaning in an ultrasonic bath. Operationally, the disassembly is accomplished by first removing the snap-on cleaner blade. The tension-locking handle is then removed from the outer collar and half can housing. The blade holder and tensioning system assembly is then longitudinally removed from the half can housing. Sufficient clearance is provided in the centrally located hole in the mounting plate to which the half can housing is attached to permit passage of the blade holder rod with key-bar, and if a bushing is employed, such clearance is provided in the bushing or by its removal.

In the case where the tension spring is not fastened to either the inner or outer collar, but has ends that reside in holes therein (which is permissible), the tensioning system (including bushings, if used) slides off the end of the blade holder. The inner collar remains on the blade holder, and usually wouldn't require removal therefrom for sufficient cleaning. A further improvement upon this arrangement is to have an additional axial slot 272 in the half can housing (described below) that is transverse (i.e. at an angle) with respect to the existing circumferential or arcuate slot and of about the same width, and extending axially from the existing slot to the distal end of the half can housing. This axial slot 272 "opens up" one side of the existing tension adjustment slot so as to eliminate the need for removal of the tension-locking handle from the outer collar for disassembly.

In the case where the tension spring is fastened to either the inner or outer collar (which is permissible), the tensioning system (including bushings, if used) slides off the end of the blade holder. The inner collar remains on the blade holder, and usually wouldn't require removal therefrom for sufficient cleaning. Alternatively, in the case where the tension spring is fastened to both the inner collar and the outer collar (which is preferable), the tensioning system and blade holder (including bushings, if used) slides out of the mounting plates as a unitary member or assembly. The additional axial slot 272 in the half can housing is advantageous in this arrangement to facilitate quick and easy removal of the tensioner/blade holder as an assembly without removal of the clamp handle.

FIGS. 8A, 8B and 8C are side-view, end-view and cross-section view schematic diagrams, respectively, of an exemplary tension adjustment tool 1230 suitable for use with the tensioning system 200 of FIGS. 4–7. Outer collar 230 is equipped with a number of equally spaced and sized through holes 236 that allow for the engagement of a tension adjustment tool 1230. Exemplary tool 1230 has two pins 1236 extending parallel from tool body 1232 and designed to slideably engage into a pair, i.e. two, of through holes 236 in outer collar 230 and to be held in place therein by detent pins or ball detents 1237, although a greater number of pins 1236 could be provided. Pins 1236 are spaced apart the same distance as the diameter of the circle on which opposing ones of holes 236 are disposed on outer collar 230. Non-circular hole 1238 in tool body 1232 provides a means for attaching a torque measuring device, such as a torque wrench or other torque-measuring device, for allowing precise and repeatable adjustment of the spring tension. Hole 1238 is typically square or hexagonal so as to be compatible with conventional socket wrenches and socket wrench drives, but may be triangular, octagonal or any other shape that can non-rotatably engage a torque wrench or other instrument or tool. Tool 1230 also has a clearance hole 1234 sized to receive the end of blade holder rod 112 that extends through clearance hole 234 in outer collar 230.

Tool 1230 provides a feature that can be important in applications where precise tensioning is required to ensure proper performance of the cleaning system or when over-tensioning could harm the conveyor belt, as in the case, for example, where the belt has a thin polyolefin top-cover and is susceptible to excessive wear or damage from an over-tensioned belt cleaner. Tool 1230 can be removed from outer collar 230 following each use, or may be left in place between uses. Alternative embodiments of a tool of this sort include: an extended torque arm, a palm-shaped end-knob, and a built in torque indicator, for example.

One inherent and valuable built-in safety feature of the system 100 of the invention is the ability to limit the maximum tension applied to tension spring 210. In certain applications, for example, conveyor belt 12 is of relatively light material and so may be easily damaged if scraper blade 120 is over tensioned, thereby producing a loss of production and the expense of belt replacement. Optionally, the tension applied to blade 120 may be limited by accurately adjusting the rotational positioning of inner collar 220 on blade holder rod 112 such that the rotation of spring 210 by outer collar 230 is restricted to a predetermined and/or safe value by locking handle 260 reaching the end of its possible physical travel in slot 270 of half-can housing 250.

To this end, the angular position at which half-can housing 250 is fixedly mounted, such as by welding, to mounting plate 20 is carefully controlled as is the angular position of inner collar 220 with respect to blade 120 on blade holder 110 (i.e. with respect to blade tip 122). Actually, the relative angular position of collar 220 may be controlled with respect to key-bar 114 of blade holder rod 112, thereby placing blade tip 122 in a known position because the size and shape of blade 120 is known. This controls the angular rotational angle of tension spring 210 assembly 210, 220, 230 relative to the blade 120 and the position of locking handle 260. Thus, the range of possible movement of locking handle 260 in angular slot 270 is controlled and limited such that the maximum desired level of spring tension (blade 120 pressure) is reached when locking handle 260 reaches the mechanical limit of its rotational travel (i.e. the end of slot 270).

Alternatively, a position adjustable device may be provided on half-can housing 250 for restricting the travel of locking handle 260 along slot 270. Alternatively or additionally, graduated scale 280 (e.g., FIG. 6) may be inscribed or otherwise placed on the rim or end 252 of half can housing 250 to be used with index feature 282 on outer collar 230 to indicate the rotation of collar 230 with respect to half-can housing 250, thereby facilitating setting and/or resetting the tension when required.

Figure 9:
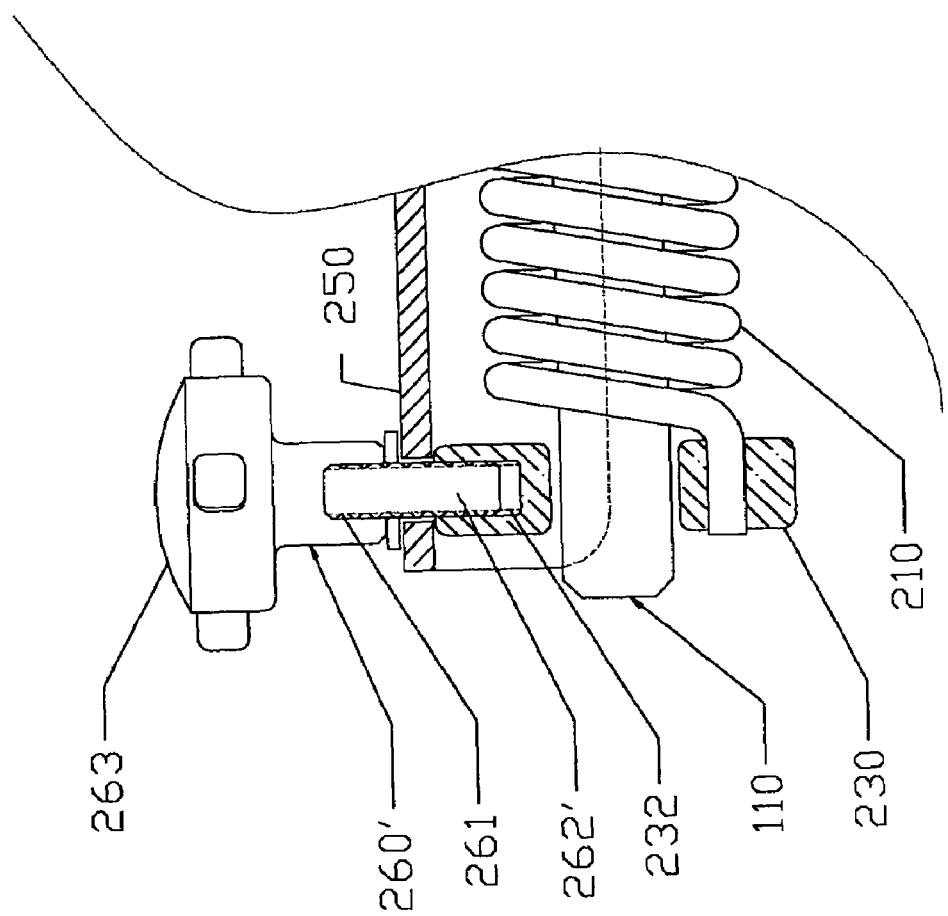
FIG. 9 is a cross-section schematic diagram showing an alternative embodiment of a portion of the tensioning arrangement of FIG. 4, FIGS. 10A, 10B and 10C are a side-view schematic diagram showing an exemplary blade holder, and end view schematic diagram showing an exemplary scraper blade and an end view schematic diagram showing engagement of the scraper blade with the blade holder, in accordance with the invention.

FIG. 9 is a cross-section schematic diagram showing an alternative embodiment of a portion of the tensioning arrangement 200 of FIG. 4. Among the problems anticipated is the case where a very strong worker applies excessive tightening force to tension-locking handle 260 or the opposite case where too little tightening force is applied to provide adequate clamping force to secure locking handle 260 and outer collar 230 in position relative to half-can housing 250. To prevent this from occurring a uniquely applied torque limiting knob 260' replaces tension-locking handle 260. Knob 260' includes a built-in clutch-like mechanism 261 at the interface between threaded stud 262' and handle 263 which operates to slip at a predetermined torque, i.e. in a manner similar to most modern motor vehicle gas caps. When the proper tightening force is applied, internal clutch 261 of knob 260' slips and prevents further tightening, prevents over tightening. When knob 260' is under tightened, clutch 261 thereof does not slip, thereby indicating to the operator that it is not sufficiently tightened. Suitable adjustable-torque clamping knobs are readily available, such as from McMaster-Carr company and others.

FIGS. 10A, 10B and 10C are a side-view schematic diagram showing an exemplary blade holder 110, and end view schematic diagram showing an exemplary scraper blade 120 and an end view schematic diagram showing engagement of scraper blade 120 with blade holder 110, in accordance with the invention. Blade holder 110 comprises a solid metallic rod 112 that includes a longitudinally aligned metallic key-bar 114 that is co-located in proximity to snap-on/snap-off scraper blade 110. Key-bar 114 protrudes beyond the circumference of blade holder rod 112 to engage into a mating socket or longitudinal slot 134 located in longitudinal cylindrical cavity 132 of snap-on scraper blade 110. Key-bar 114 fixes the rotational position of blade 120 with respect to blade holder 110 and transmits the torsional force applied by torsion spring 210 to scraper blade 120, thereby causing scraper blade 120 to impart a force to belt 12 across the blade/belt interface. Key-bar 114 also reacts against forces externally applied to scraper blade 120 (which may include forces that are potentially damaging to blade 120 and/or blade support 110) and transmits such forces back to torsion spring 210 via blade holder rod 112 and inner collar 220.

The "cylindrical" geometry of blade holder rod 112 is chosen to facilitate the shedding of and to prevent the undesired build-up of material on the blade holder 110 surface. The length L of key-bar 114 is preferably about equal to the length of blade 120, however, key-bar 114 does not necessarily need to be continuous over the entire length L of blade 120 and could be installed as adjacent or as discontinuous sections over the blade 120 length. Key-bar 114 is permanently affixed into a precision machined longitudinal slot 115 located in blade holder rod 112 and affixed by any of several means, including welding, mechanical staking, shrink-fitting, or with application of adhesive, such as food-grade adhesive. The overall length of blade holder rod 112 is determined by the length L of blade 120 plus additional length on each end to extend blade holder 110 beyond each of mounting plates 20 and the tensioning unit 200 outer collar 230 on the side with tensioning system 200. For certain (typically very wide belt-width) applications, it might be desirable to have two tensioning units, one on each side of conveyor belt 12, i.e. one at each end of blade holder rod 112. In these cases the length of blade holder 110 is extended to accommodate each of the two tensioners 200.

Typically, key-bar 114 and rod 112 are fabricated from stainless steel, however, other materials of construction can be used including: steel, surface-treated steel, aluminum, and plastics (e.g., nylon). Stainless steel is often most desired for food manufacturing applications for the obvious reasons of cleanability, corrosion-resistance, and aesthetics. As recommended by the Baking Industry Sanitation Standards Committee (BISSC), the surface finish on these parts, as well as the elements of tensioner 200, will typically be <70 micro inches (average) for food-grade applications.

Additionally, blade holder 110 includes at least one engaging feature 116, such as fixed metallic pin 116, which extends radially from rod 112 in substantially the same direction as does key-bar 114. When engaged into a mating socket or recess (not visible) on snap-on scraper blade 120, pin 116 provides an engaging feature 116, i.e. a means, for fixing the longitudinal position of blade 120 along blade holder 110 to prevent lateral or sidewards movement of blade 120 with respect to blade holder 110. Fixed pin 116 is permanently attached to blade holder rod 112 by press-fitting into a mating blind hole 117 and is typically of like material. To further ensure the permanent fixing of pin 116 in rod 112, it is welded, adhered, or staked in place, in like manner to key-bar 114. Fixed pin 116 may be located at any suitable location along the length of blade holder rod 112.

Instead of a pin 116, engaging feature 116 could also be another suitable shape, for example, a smooth-surfaced hemisphere or semi-sphere (a portion of a hemisphere) or other shape that is acceptably designed to engage a corresponding recess in blade 120 to restrain the lateral freedom of movement of blade 120. The hemisphere or semi-sphere design is desirable since the mating socket on snap-on scraper blade 120 is easily cleaned. Alternatively, the protruding engaging feature can be on blade 120 and the corresponding recess on blade holder 110.

As previously described, scraper blade 120 is preferably fabricated from elastomeric/plastic materials and is uniquely designed to permit legs 130 to snap-engage onto and to snap-release from rod 112 of blade holder 110. The main function of blade 120 is to dislodge material being carried by conveyor belt 12 to be dislodged therefrom by scraping action. Blade-tip 122 is the location where blade 120 makes contact with conveyor belt 12. The shape of blade-tip 122 is configured to facilitate an effective scraping action when held against the conveyor belt 12 at an appropriate angle and applied pressure. Blade-tip 122 continuously wears throughout its service life, thus causing the effective radial length of blade 120 (i.e. the distance between centerline CL of rod 112 and tip 122) to decrease over time. Torsion spring 210 accommodates this wear and acts to maintain a near constant force at blade-tip 122. As blade 120 wears, the decrease in spring force that would result tends to be somewhat compensated by the shorter radial length between blade holder rod 112 and tip 122 of blade 120, because the force ($F_T$) at tip 122 equals the spring 210 torque (T) divided by the radial distance ($R_T$) of tip 122 from rod 112, i.e. $F_T = T/R_T$.

Blade 120 is deliberately shaped so as to provide an efficient scraping action with minimal residual material, which shape can generally be appreciated from FIGS. 1 and 2, and from FIGS. 10B and 10C. Contoured-side 126 of scraper blade 120 is deliberately shaped to efficiently enhance shedding and expulsion of material from tip 122 and side 126 of blade 120. The flat-side 124 of scraper blade 120 has a shape that facilitates the shedding of material that undesirably passes blade-tip 122 and adheres to what is the back-side of blade 120 (at least when used in a primary scraper configuration bearing against the belt 12 as it passes over head pulley 14). Flat surface 124 ensures the continued existence of an effective scraping angle (i.e. an acute angle) between blade-tip 122 and conveyor 12 throughout the service life of blade 120. The surface finish, of both the contoured and flat sides of the blade, is normally <70 micro inches (average), as is desirable to minimize adhesion of foreign matter and improve cleanability in food-grade applications.

One unique feature of scraper blade 120 is the dual function performed by the pair of opposed legs 130. Legs 130 are designed to perform as "skirts" while simultaneously providing the snap-on functionality. Legs 130, which are slick (low coefficient of friction) smooth contoured surfaces similar to the rest of blade 120, prevent the build-up of material on the blade holder 110 by extending the sides, i.e. the flat surface 124 and the contoured surface 126, of blade 120 and minimizing exposure of the surfaces of blade holder 110. The novel snap-engagement function, i.e. snap on installation and snap off disassembly, is accomplished by allowing legs 130, which define a longitudinal cylindrical cavity 132 in blade 120, to semi-elastically deform by extending outward (arrows 131 in FIG. 10C) as snap-on blade 120 is pressed (arrow 133) over blade holder rod 112 and key-bar 114. As rod 112 reaches full engagement, legs 130 nearly encircle rod 112 which is then disposed in cylindrical cavity 132. If properly designed, e.g., with the diameter of cylindrical cavity 132 when empty being slightly less than the diameter of rod 112, legs 130 do not return to their rest position, but remain partially spread thereby applying a slight clamping force against blade holder rod 112. This provides a desirable and unique feature that enables a passive sealing action between the interior cavity 132 portion of snap-on-blade 120 and blade holder 110.

Longitudinal key-bar mating slot 134 is located within cavity 132 and dimensioned to engageably accept the key-bar 114 during installation of snap-on-blade 120 onto blade holder rod 112. A chamfer or fillet 136 is provided at the insertion edge of longitudinal slot 134 to aid in guiding key-bar 114 into slot 134. Another fillet is located at the base of key-bar mating slot 136 so as to provide a smooth transition between the bottom surface and the side surfaces thereof, thereby to facilitate cleaning and to prevent the accumulation of material along the interior corners of slot 134.

Another unique feature of the inventive system is the manner in which snap-on scraper blade 120 can be removed from blade holder 110 to facilitate regular cleaning and/or periodic blade replacement. This removal operation is performed after relieving the tension of blade 120 against conveyor belt 12, which is accomplished by loosening tension-locking handle 260 and rotating handle 260 along the length of slot 270 of half can housing 250. There are several methods that can be employed to remove the blade. The simplest method is to apply sufficient force, using one's fingers, to legs 130 parallel to key-bar 114 near either end of blade 120, causing blade 120 to "un-snap" from blade holder rod 112. This method is viable whenever the surface of blade 120 is not too slippery or adhered material is not hampering its removal from holder 110. The design of blade-holding legs 130 takes into account the force required for finger removal of blade 120, and this method is designed to work for many applications and blade materials.

FIG. 11 is a schematic diagram illustrating removal of a snap-on blade 120 using an exemplary L-shaped tool 1140, in accordance with the invention. "L"-shaped hand tool 1140 engages key-bar slot 134 at the end of blade 120 and then lever handle end 1118 of tool 1140 is moved to apply a pulling force to separate and disengage blade 120 from holder rod 112, either directly or by lever action. When this method is used, the length of key-bar 114 is intentionally made shorter than the length of blade 120 to provide an engagement volume at an end thereof sufficient to receive lever tool end 1114 of "L"-shaped hand tool 1140. Another method of blade removal involves sliding blade 120 off the end of blade holder rod 112 on the side opposite tensioning system 200. This approach is useful whenever system-level extraction is performed, (i.e., "tensioner" 200 and blade holder 110 are also being removed). Another method using an "L"-shaped tool is described below.

Figure 12C:
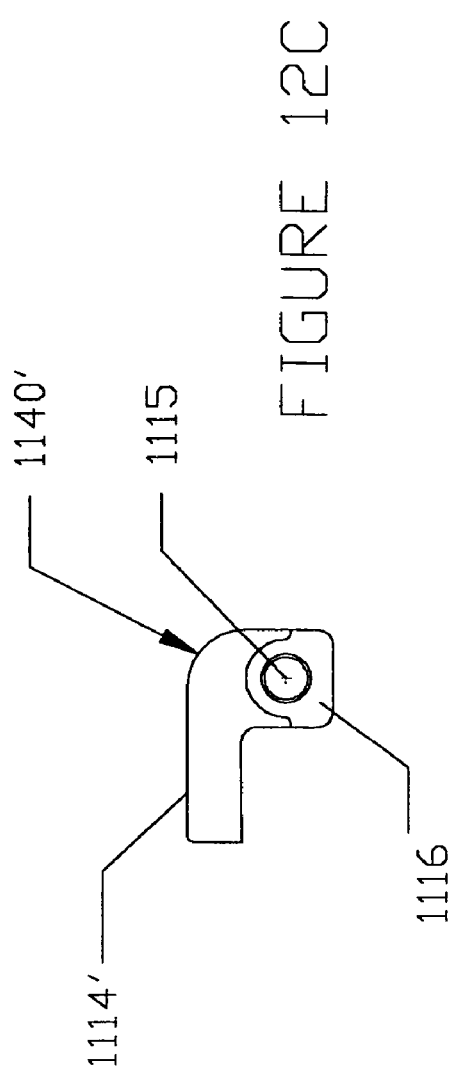
FIG. 12C is a side-view schematic diagram of the lever thereof and FIG. 12D is a cross-section view schematic diagram thereof, all in accordance with the invention.
Figure 12D:
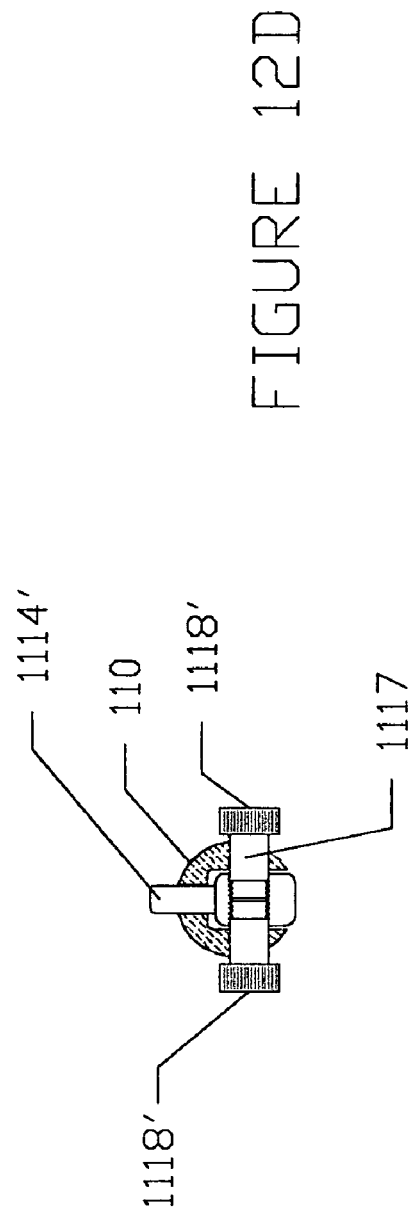

FIGS. 12A and 12B are side-view and top-view schematic diagrams, partially in cross-section, of an alternative exemplary blade-removal lever mechanism 1140', FIG. 12C is a side-view schematic diagram of the lever 1114'–1116 thereof, FIG. 12D is a cross-section view schematic diagram thereof, and FIGS. 13A and 13B are side-view and end-view cross-section schematic diagrams of the blade-removal lever mechanism 1140' of FIGS. 12A–12D when fully actuated, all in accordance with the invention. In certain applications, there is a need for a built-in mechanical device capable of imparting a significant force to urge blade 120 off of blade holder 110, such as in those cases where significant adhesion exists between blade 120 and blade holder 110. A novel built-in lever-type mechanism 1140' that allows for the forceful extraction of snap-on blade 120 is located inside a cavity 113' of blade holder 110 at any desired location along the blade length. Typically, a channel-slot 1113' is machined into blade holder rod 112' to allow lever mechanism 1140' to be inserted into blade holder 110 and a through hole 1115 made in rod 112' transverse to the machined slot. A portion of key-bar 114 is eliminated or removed from the region of lever mechanism 1140' leaving key-bar 114'.

"L"-shaped lever 1114'–1116 comprises an extended arm or lever tool section 1114' of similar cross-sectional size and shape to key-bar 114' that when not actuated resides along the region that would be occupied by key-bar 114' but for it being removed to provide for lever mechanism 1140'. Lever 1114'–1116 also comprises a handle section 1116 that is disposed in cavity 1113' of rod 112' and that includes a threaded hole 1115 which accepts a pair of socket-head cap screws 1118' inserted from both sides of rod 112' for mounting and actuation. The shank of each socket head cap screw 1118' passes through opposing clearance holes 1115 that are provided in blade holder rod 112' and are transverse to the centerline thereof. Socket head cap screws 1118' provide support and locate lever mechanism 1114'–11116 by centering their shoulders inside clearance holes 1115 in blade holder rod 112. Socket head cap screws 1118' are sufficiently tightened against each other to lock up and permanently fix their rotation with respect to lever 1114'–1116 inside lever-mechanism 1140'. Additional means of fixing cap screws 1118' with respect to lever 1114'–1116 may be provided by welding or staking to prevent future rotation with-in the body of lever mechanism 1140'. Because extended arm 1114' of lever mechanism 1140' has a cross-section nearly identical to blade holder key-bar 114', when blade 120 is attached to blade holder 110, extended arm 1114' is engaged into key-bar mating slot 134 of blade 120.

Blade removal is accomplished by first engaging a hex key tool (not shown) such as a conventional Allen wrench, into the socket head of either or both of cap screws 1118'. Turning the hex key tool in the appropriate direction (i.e. for rotation of cap screw 1118') causes lever tool portion 1114' of lever-mechanism 1140' to swing deeper into mating key-bar slot 134 of blade 120. By causing the lever-mechanism 1140' to fully-actuate, blade 120 is sufficiently translated radially away from rod 112' to locally free it from blade holder 110. By simple hand-action blade 120 is then removed the rest of the way. Lever mechanism 1140' also provides longitudinal restraint of blade 120 against movement along blade holder 110 using the socket head of one or both of cap screws 1118'. To accommodate the socket head(s) of cap screws 1118', small open-ended slots or notches 121 are provided in legs 130 of snap-on blade 120. Engagement of notches 121 of legs 130 about the heads of cap screws 1118' causes blade 120 to be laterally restrained along blade holder 110, thereby eliminating the need for earlier described fixed pin 116 on key-bar 114 and a corresponding mating socket on blade 120.

Alternative embodiments and variations to embodiments of belt scraping system 10, including blade tensioner 200, scraping blade 120, and blade holder 110, described above in relation to FIGS. 1–13 are described in relation to FIGS. 14–20 following. Certain of these alternatives and variations facilitate assembly and disassembly of scraping system 10 and/or scraper blade 120, while others are directed to facilitating the setting and/or adjustment of blade tension.

Figure 14:
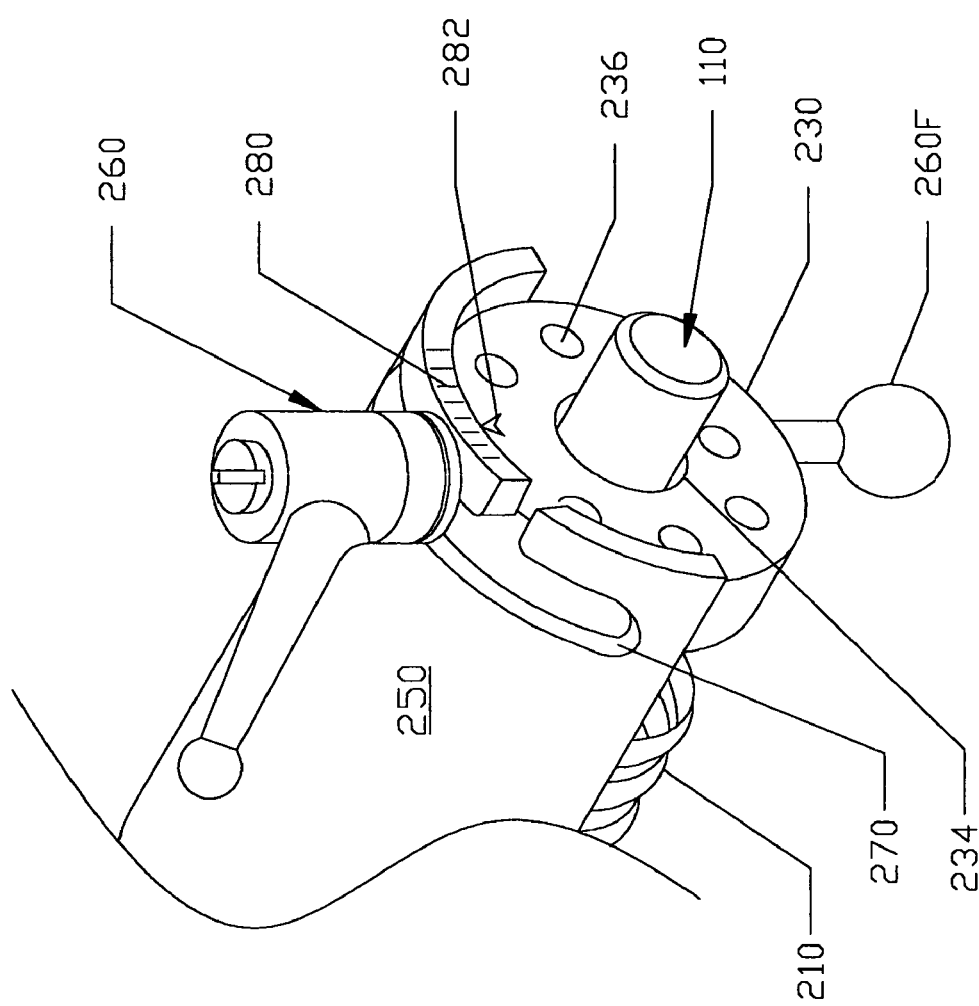
FIG. 14 is an isometric view schematic diagram of an end of the tensioning arrangement of the system of FIGS. 1 through 7 including an additional axial slot in the housing thereof.

FIG. 14 is an isometric view schematic diagram of an end of tensioning arrangement 200 of system 10 of FIGS. 1 through 7 including an additional axial slot 272 in half-can housing 250 thereof for facilitating assembly and disassembly of scraping system 10. Half-can housing 250 is as described above except that axial slot 272 of similar width to circumferential slot 270 is added. Axial slot 272 allows for passage of stud 262 of locking handle 260 from slot 270 without its removal from outer collar 230. Thus, locking handle 260 is rotated (loosened) to release the pressure fixing outer collar 230 in relation to half-can housing 250 and locking handle 260 is moved along slot 270 and through slot 272 so as to be released and free from half-can housing 250. Because handle 260 is threaded into outer collar 230, outer collar 230 is likewise released and free from half-can housing 250. Further, torsion spring 210, blade holder 110 and inner collar 220 are likewise free to be removed (with the release of collar 230), all without disturbing mounting plates 20 and half-can housing 250 from their fixed positions in the desired alignment with respect to conveyor 12. If ends 212, 214 are fixed, e.g., welded or adhered, to inner collar 220 and outer collar 230, as they may be, then the entire assembly of blade holder 110, spring 210, collars 220, 230 and handle 260 are removed as a unit from the mounting arrangement 20, 250. Even if ends 212, 214 of spring 210 are not fixed to collars 220, 230, the parts 110, 210, 220, 230, 260 may be grasped and removed together as if they were a unit. It is noted that blade 120 is removed from blade holder 110 prior to removal of blade holder 110 from mounting plates 20.

As a result, blade assembly 100 may easily, quickly and conveniently be removed either as pieces 230/260, 220, 210, 110, or as a unit (blade 120 having been removed), thereby to facilitate cleaning, whether at the location of conveyer 12 as by IPC or remotely therefrom as by COP. Further, the remaining mounting plates 20 and half-can housing 250 are very open and so may be easily cleaned and sanitized in place. In addition, threaded through hole 232 in outer collar 230 also allows an additional handle such as a cylindrical or a ball-knob handle 260F to be threaded therein in a position 180° opposed to locking handle 260, which can aid an operator in adjusting the spring and scraper blade tension. Alternatively and/or additionally, optional graduated scale 280 on end 252 of half can housing 250 is used with index feature 282 on outer collar 230 for setting and/or resetting the tension when required.

Figure 15:
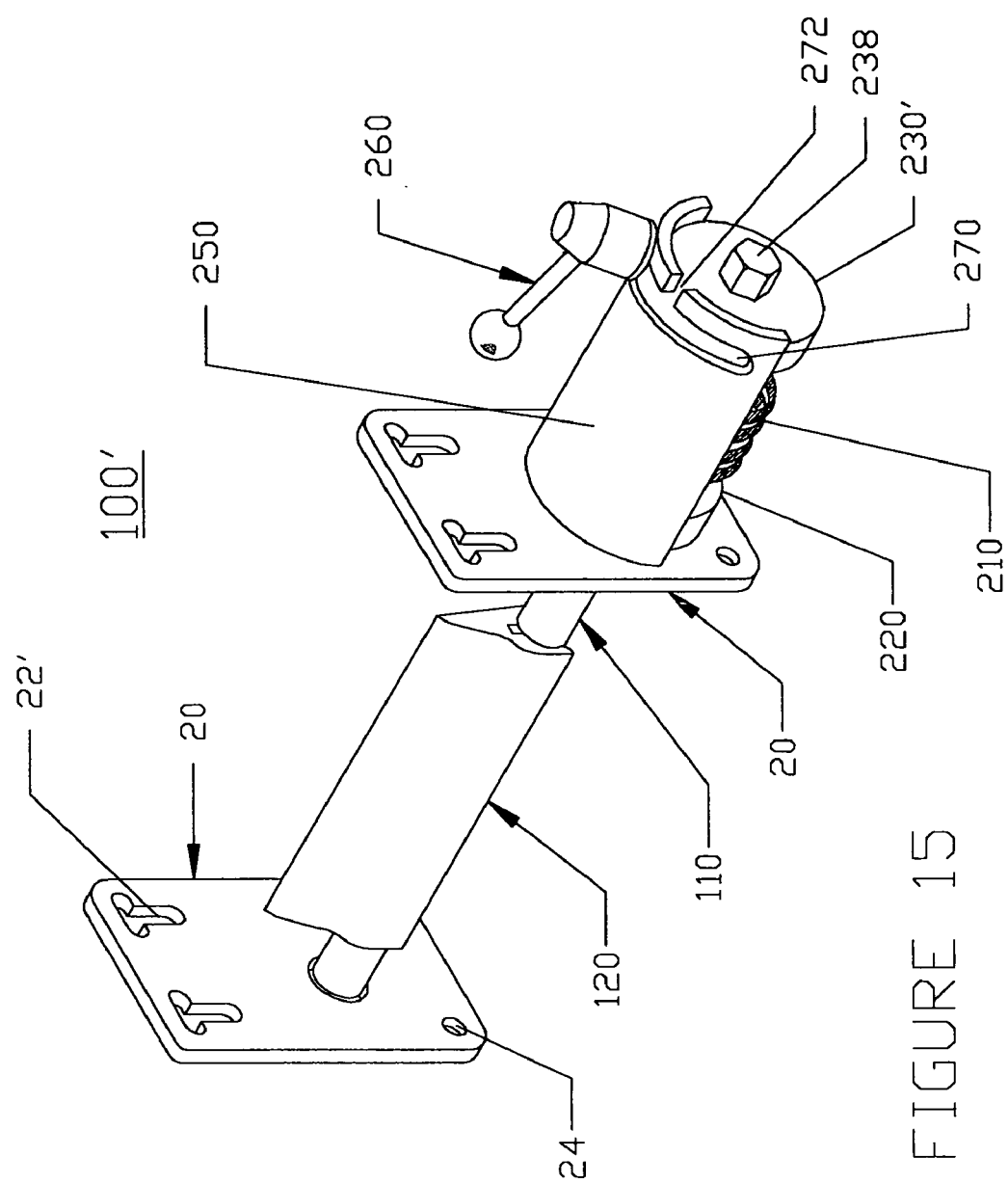
FIG. 15 is an isometric view schematic diagram of an alternative exemplary scraping system arrangement in accordance with the invention.

FIG. 15 is an isometric view schematic diagram of an alternative exemplary scraping system arrangement 100' in accordance with the invention, and FIGS. 16A and 16B are end-view and side-view cross-section schematic diagrams, respectively, of an alternative embodiment of an outer collar 230 suitable for use in, for example, the tensioning arrangement 200 of FIG. 4 or 15.

As above, scraping system 100' includes a snap-on scraper blade 120 mounted on a blade holder 110 rotatably supported by mounting plates 20. Blade holder 110 and scraper blade 120 are tensioned against a conveyor belt by tensioner 200 including torsional spring 210, inner collar 220, outer collar 230 in cooperation with half-can housing 250, wherein the desired tension is maintained by clamping down of tension-locking handle 260. Among the variations are that mounting holes 24 in mounting plates 20 are "T"-shaped slots 22' rather than being elongated slots 22, thereby to facilitate the installation and proper positioning of the scraping system to conveyor belt 12 and its support structure 16, as well as the making of any adjustments as may become necessary or desirable in operation.

In system 100', outer collar 230' is solid and includes a coaxial or concentric hexagonal head 238 extending therefrom to which a conventional torque wrench may be applied for setting a desired scraper blade tension. Because hexagonal head 238 is centrally or concentrically located on outer collar 230', its central axis is substantially co-linear with the axis of rotation of blade holder 110, so that the torque applied to hexagonal head 238 is directly related to the torque applied to scraper blade 120 through blade holder 110, inner collar 220 and tension spring 210. As a result, the tension of spring 210 (and thus the pressure at blade 120) may be precisely and repeatably applied and set.

In addition, the need for a special tensioning tool (e.g., tool 1230 of FIG. 8) and for extra holes 236 in outer collar 230 to receive the tool, are avoided. As a result, outer collar 230' is simplified and, in particular, need have only two through holes, i.e. one threaded hole 232 that receives threaded stud 262 of tension-locking handle 260 and one through hole 236 that receives end 214 of tension spring 210 which may rest therein or be welded or otherwise fastened therein.

Preferably, tension spring 210 is welded to inner and outer collars 1220, 230 so as to be a unitary member or assembly that is easily removable as a unitary member by releasing clamp 260 and moving it through longitudinal slot 272. Because inner collar is fastened to blade holder 110, blade holder 110 and such unitary assembly of spring 210 and collars 220, 230 are easily removed together.

It is noted that collar 230' has fewer holes and openings in which food or other debris can accumulate, thereby facilitating cleaning and maintenance. Threaded through hole 232 in outer collar 230' also allows an additional handle such as a cylindrical or a ball knob handle 260F to be threaded therein 180° opposed to locking handle 260.

Outer collar 230' may have one or more additional holes 236 if it is desired that one type of outer collar 230 accommodate tension springs 210 of different strengths, such as a light-duty spring (smaller diameter helical element) and a heavy-duty spring (larger diameter helical element), as shown in FIG. 16A. Spring 210 may be welded into hole 236 in outer collar 230', thereby eliminating a hole or crevice in which debris can accumulate. It is noted that blade holder 110 is adequately supported and rotatably mounted by inner collar 220 and holes 28 of mounting plates 20, and that tension spring 210 and outer collar 230, 230' are both adequately supported by inner collar 220 and tension-locking handle 260, and so there is no need for a hole in outer collar 230, 230' to receive an end of blade holder rod 112. The support of blade holder 110 at holes 28 of mounting plates 20 may employ a suitable bushing 30, such as a bushing 30, 30A, 30B described above, which may be of UHMW-PE, Delrin®, PTFE, nylon or other plastic.

Figure 17A:
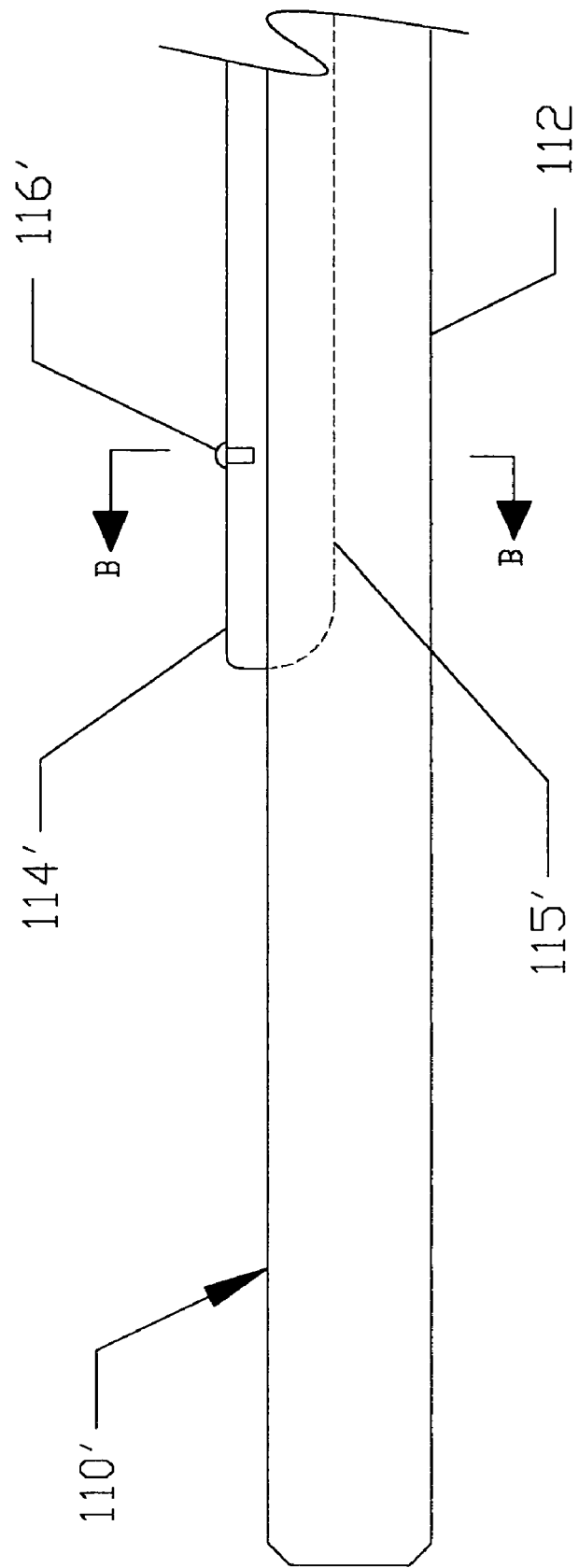
FIG. 17B is a cross-section schematic diagram of the blade holder of FIG. 17A.
Figure 17B:
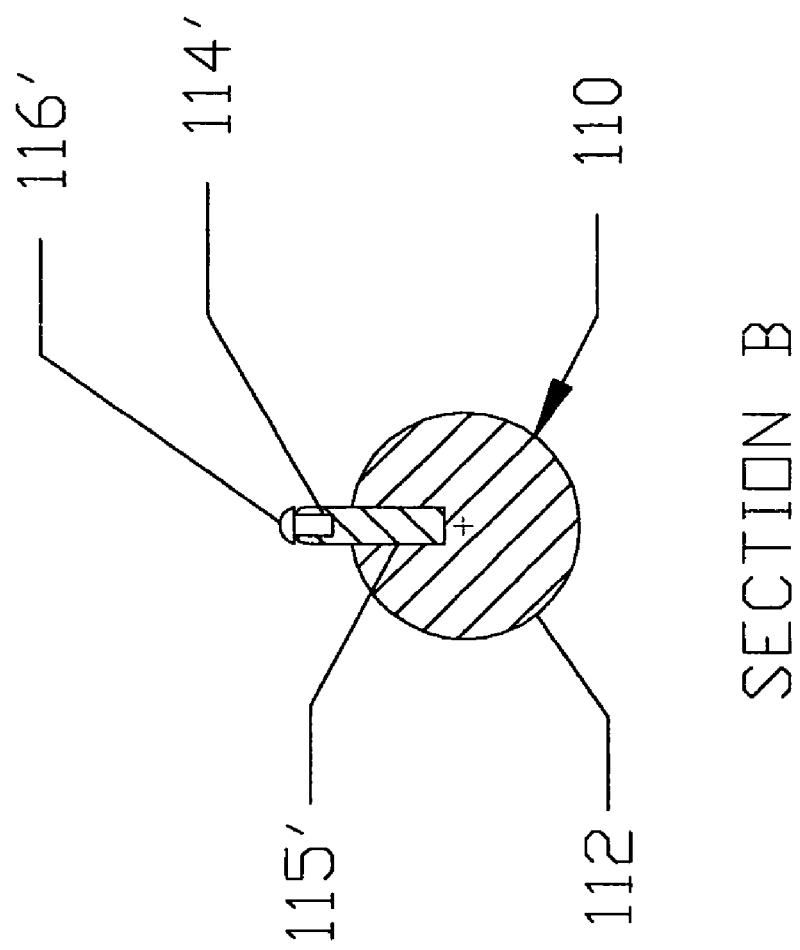

FIGS. 17A and 17C are side-view schematic diagrams, respectively, of an exemplary alternative blade holder 110' and a complementary alternative scraper blade 120' therefor, and FIG. 17B is a cross-section schematic diagram of the blade holder 110' of FIG. 17A, Blade holder 110' includes a key-bar 114' extending from a longitudinal slot 115' in blade holder rod 1112 to engage snap-on scraper blade 120 installed thereon in a predetermined angular (i.e. radial) position. Indexing feature 116' extends or protrudes from the flat outer surface of key-bar 114' to provide a transverse position indexing feature. For example, a screw, rivet or pin having a hemispherical head (or other shaped head) may be driven into a hole in key-bar 114'. Thus, scraper blade 120 and blade holder 110 are maintained in a preferred relative transverse (i.e. axial) position by pin 116' projecting from key-bar 114' so that blade 120' is in a desired transverse position with respect to the width of conveyor belt 12. Correspondingly, one or more indexing features 136 along key-bar mating slot 134 of scraper blade 120' are provided to engage with indexing feature 116' of key-bar 114' to position blade 120' at one or more selected longitudinal positions with respect to blade holder 110', thereby providing for transversely indexed positioning of scraper blade 120' with respect to the width of conveyor belt 12. Scraper blade 120' is thus slideably indexed along blade holder 110' to provide for simplified and expedient adjustment of the lateral position of blade 120' along blade holder 110', i.e. relative to conveyor 12.

Figure 18:
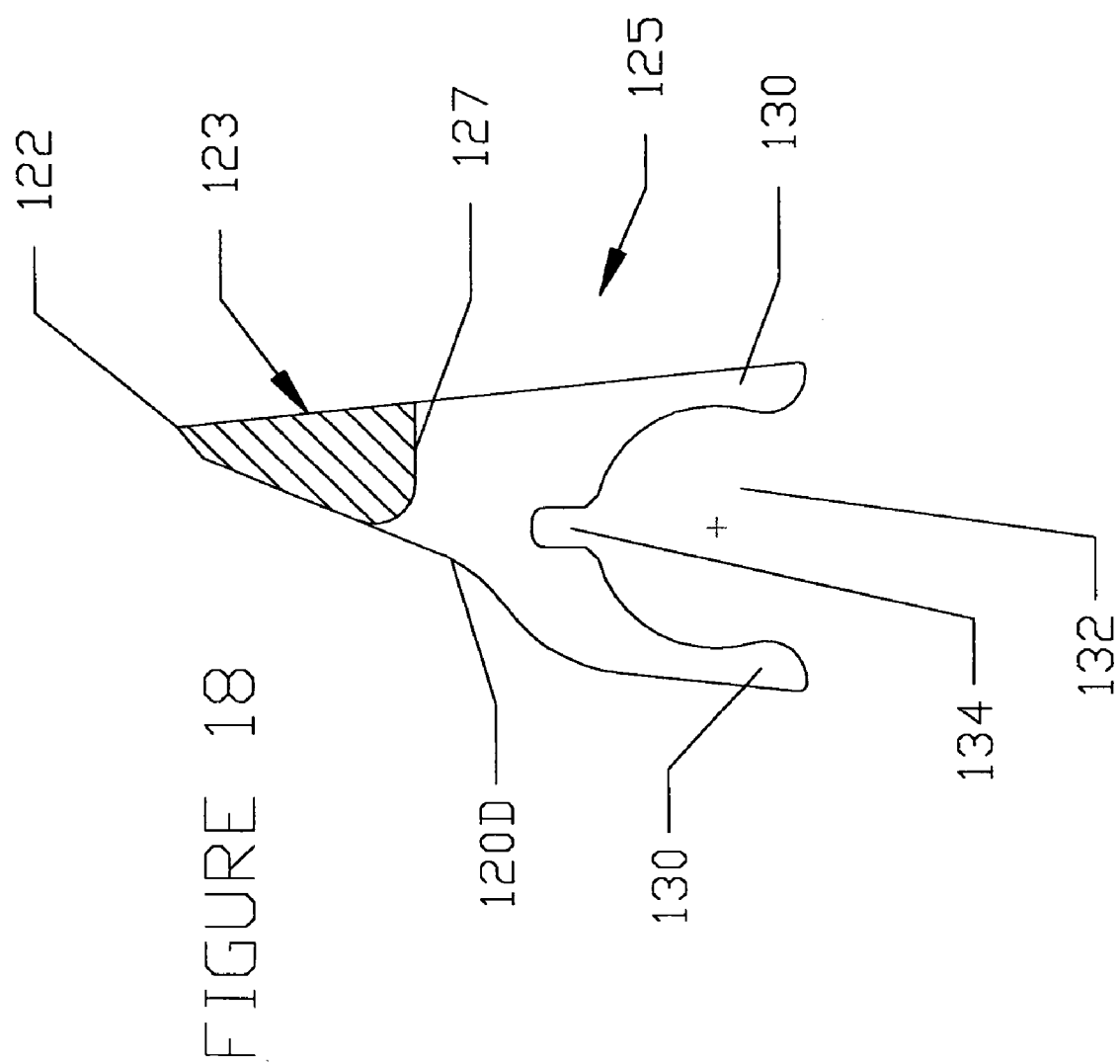
FIG. 18 is a schematic diagram of an alternative embodiment showing an exemplary scraper blade of two different materials.

FIG. 18 is a schematic diagram of an alternative embodiment showing an exemplary scraper blade 120D formed of two different materials. Blade 120D has a blade tip portion 123 that is formed of a soft plastic, such as a thermoplastic resin (TPR) to define a blade edge or tip 122 that is soft and compliant, as is desirable for use with a belt having a soft cover or as a "squeegee" with a wet belt. Blade 120D has a base portion 125 that is a resilient body formed of a resilient plastic material, such as the materials described above in relation to blade 120, that has sufficient strength and resiliency so that resilient skirts 130 releasably grasp a blade holder 110 as above within cavity 132 for installation and removal in a snap-on-snap-off manner. The materials of resilient body 125 and soft tip portion 123 are selected of compatible materials that strongly bond to each other along bond surface 127, and are preferably of food grade materials where intended for food processing usage. Soft tip portion 123 preferably is of a Sanoprene thermoplastic elastomer material having a durometer of about 85 Shore A and body portion 125 is of PVC or polyurethane or similar food-grade material having a durometer that is substantially higher, e.g., 100 Shore A or higher.

Figure 19:
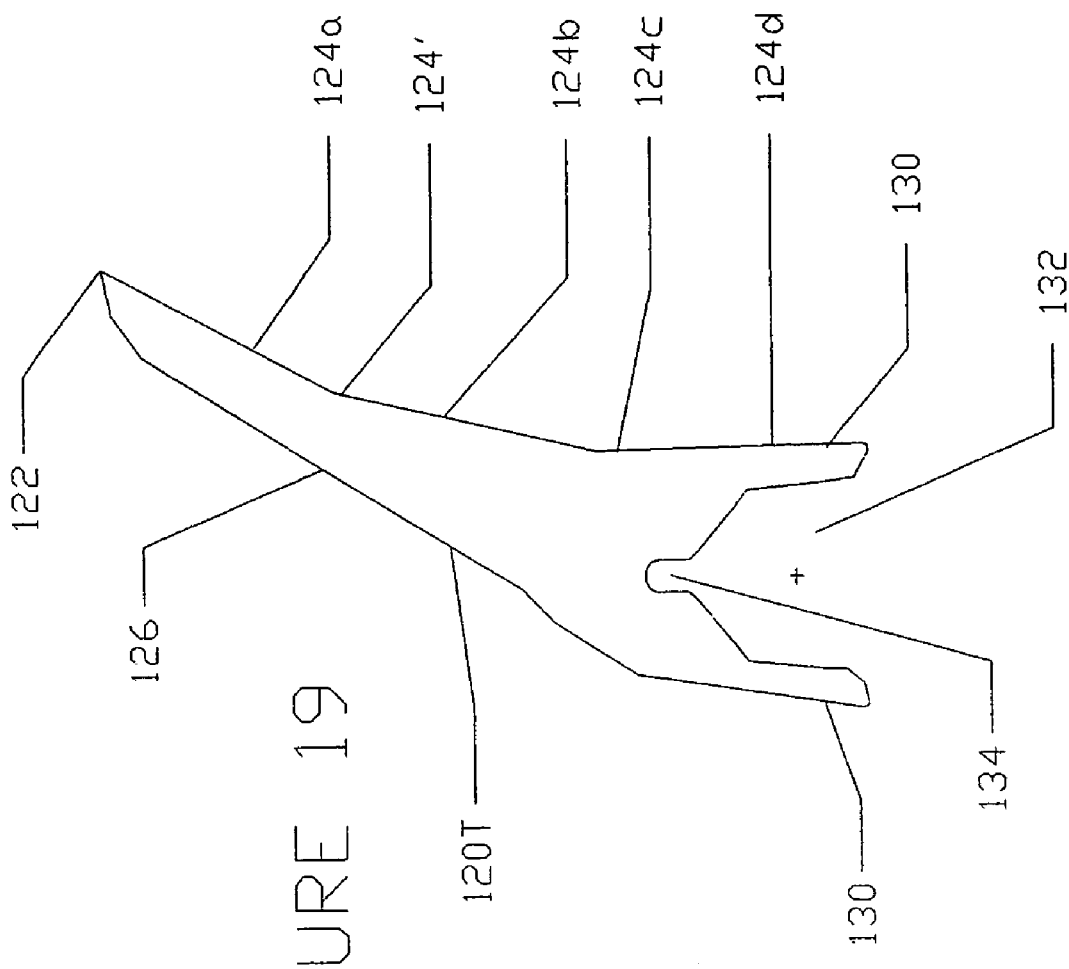
FIG. 19 is a schematic diagram of an alternative embodiment showing an exemplary tall scraper blade.

FIG. 19 is a schematic diagram of an alternative embodiment showing an exemplary tall scraper blade 120T for snap-on installation on blade holder 110 and snap-off removal therefrom. One feature of the invention provides a unique, easy-to-install and easy-to-remove, snap-on/snap-off blade and corresponding blade holder suitable for a "family" of blades and blade holders adapted for particular applications. The blade's "legs" not only perform as skirts to shed scraped material and provide for the snap-on/snap-off feature, but also provide, due to the legs' residual clamping-force action, a passive sealing of the blade against the blade holder.

Tall scraper blade 120T is like blade 120 described above and is modified to have a greater dimension between blade tip 122 and skirts 120 and to have a shaped side surface 124'. Side surface 124' is shaped either by a number of adjacent flat segments 124a, 124b, and so forth, or by a continuous arcuate surface which may or may not have a constant radius of curvature. Longitudinal cavity 132 may be cylindrical or may be of other shape, such as hexagonal cross-section as illustrated, so as to receive blade holder rods 112 that are cylindrical or of corresponding cross-section, such as hexagonal. Tall blade 120T is adapted for application where additional blade "reach" is desired, as is often the case for primary (head pulley 14) cleaners, particularly where the diameter of head pulley 14 is small, e.g., 1–6 inches (about 2.5–15 cm). This arrangement allows the blade holder 110 centerline CL to be sufficiently removed from the pulley 14 centerline to allow blade holder 110, mounting plates 20 and tensioner 200 to clear the support structure of pulley 14, such as pillow blocks, bearing assemblies and head pulley drive components.

Figure 20A:
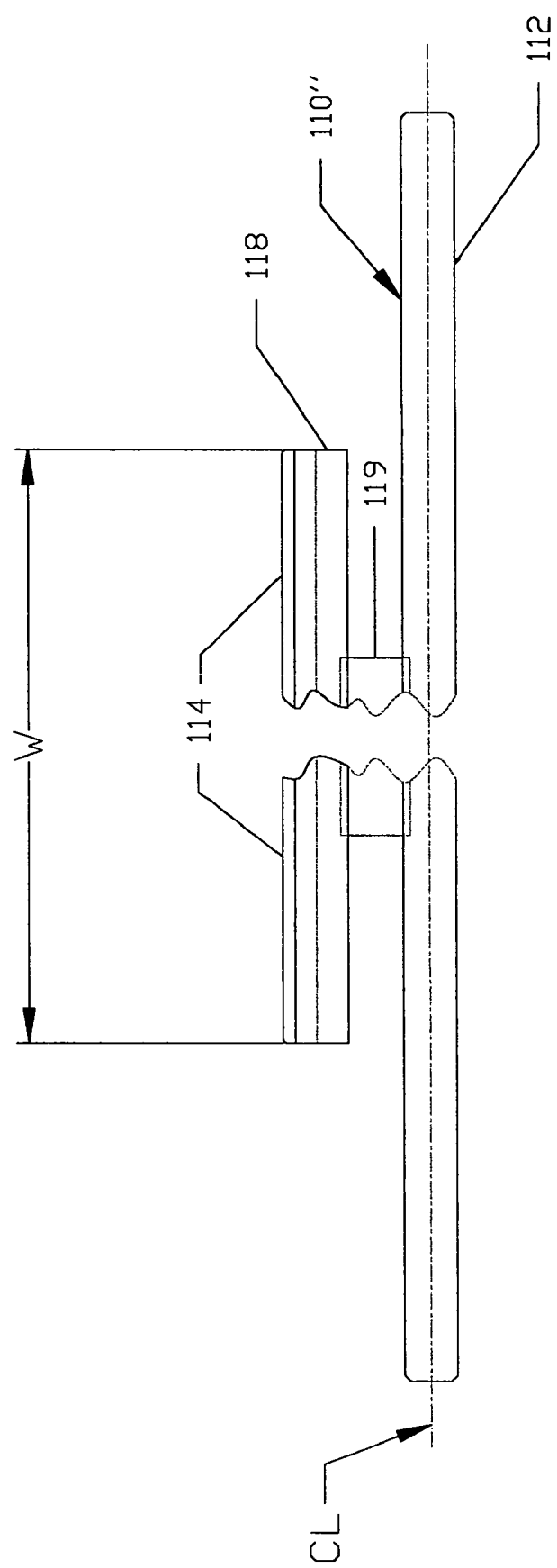
FIG. 20A through 20C are side-view, end-view and end-view cross-section schematic diagrams, respectively, showing an alternative exemplary long-span blade holder and a snap-on scraper blade therefor in accordance with the invention.
Figure 20B:
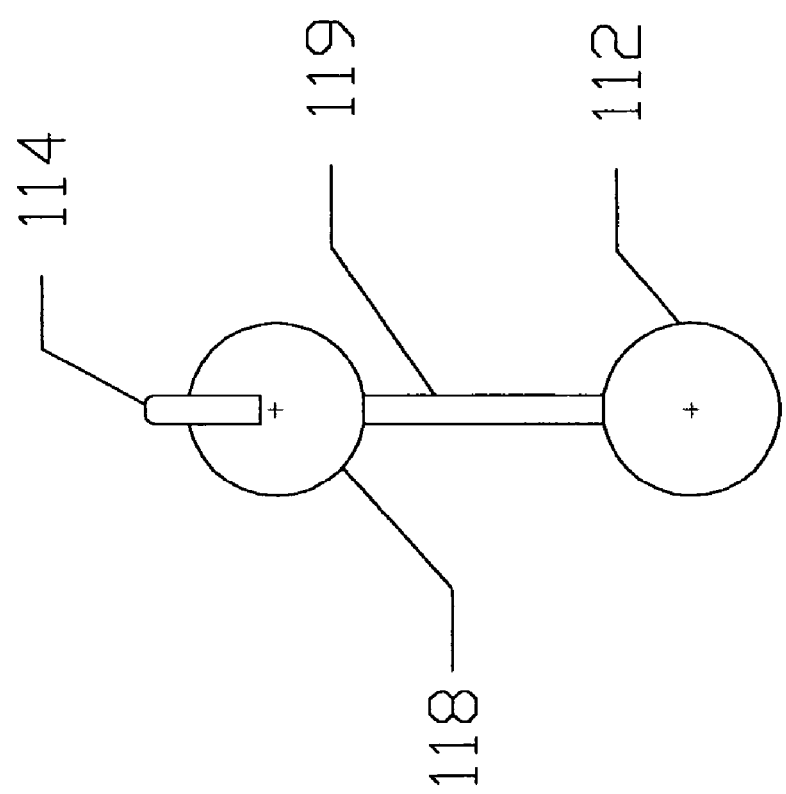
Figure 20C:
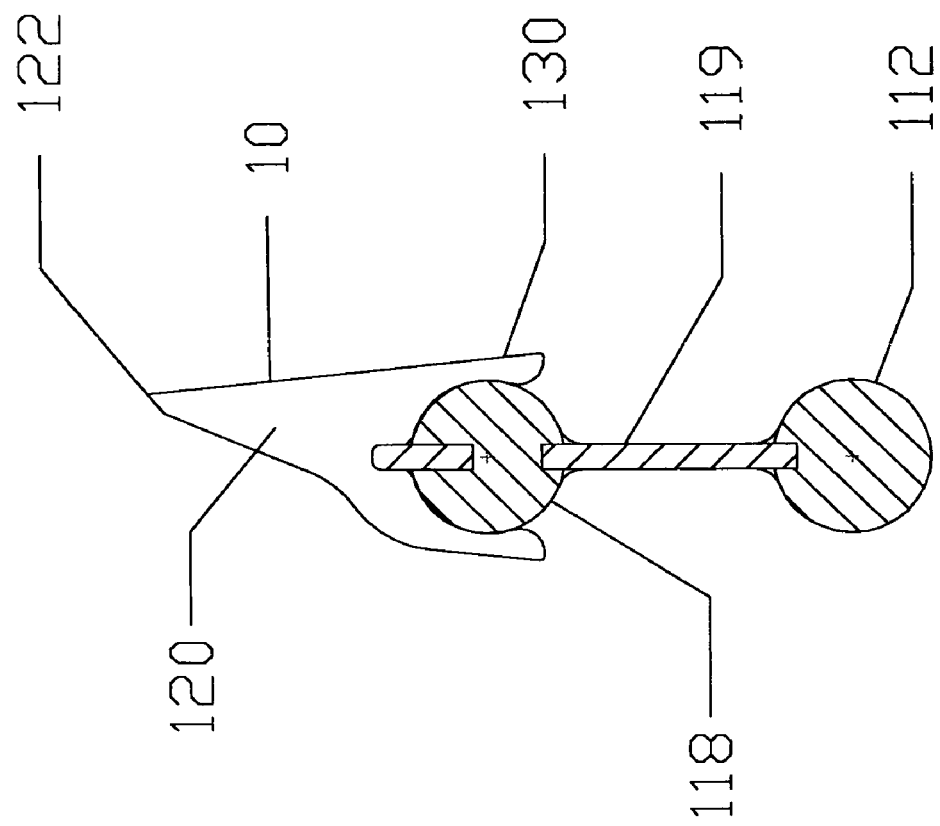

FIG. 20A through 20C are a side-view, end-view and end-view cross-section schematic diagrams, respectively, showing an alternative exemplary long-span blade holder 110" and a snap-on/snap-off scraper blade 120 therefor in accordance with the invention. Long-span blade holder 110" is useful where it is desired to employ the invention with a blade holder 110 of great width, e.g., greater than about 50–60 inches (about 125–150 cm), as may be necessary where either the conveyor 12 or the conveyor supports 16 are widely spaced, or where it is desired to have the blade edge 122 of blade 120 positioned at a greater radial distance from the axis of rotation CL of blade holder 110, or where it is desired that the blade 120 is positioned at an angle with respect to (rather than substantially perpendicular to) the direction of travel of conveyor 12. Blade holder offset rod 118 and blade holder central rod 112 (which is rotatable about the axis of rotation CL of blade holder 110") are joined and connected by blade holder web 119. The cross-section of blade holder 110" is that of a dumb-bell or an I-beam which provides greater rigidity and resists twisting and/or bending. Web 119 also positions blade edge 122 further from axis of rotation CL of blade holder 110". The assembly of rods 112 and 118 by web 119 and key-bar 114 may be held together by suitable adhesive or by welding, as is convenient. Rods 112 and 118 are typically solid ¾-inch diameter stainless steel rods and web 116 is ⅛-inch-thick stainless steel. It is noted that while the length of blade holder rod 112 may be quite long, the length of offset rod 118 and of blade 120 mounted thereon my be substantially shorter. Long-span blade holder 110' can accommodate blades 120 of long length, e.g., lengths of about 10–16 feet (about 3–4 meters).

For food processing applications, metal parts, such as blade holder 110, 110', 110", tension spring 210, inner and outer collars 220, 230, 230', half-can housing 250, mounting plates 20, handles 260, and the like are preferably stainless steel, and more preferably are corrosion-resistant, electro-polished 300-series stainless steel. Stainless steel and other metal parts may be finished to a 70 µ-inch surface finish for sanitary as well as appearance reasons. For food processing applications, scraper blade 120, 1120 and spring bushing 216 and bushings 30, 30A, 30B in mounting plates 20 that support blade holder rod 112 are preferably of ultra-high molecular weight polyethylene (UHMW-PE) or other food-grade material, e.g., FDA/USDA food-grade material generally accepted for use in food processing and manufacturing. For other applications, other materials, such as stainless steel, steel, aluminum, composites, nylon, Teflon, other plastics and the like may be utilized as appropriate and convenient.

Figure 21:
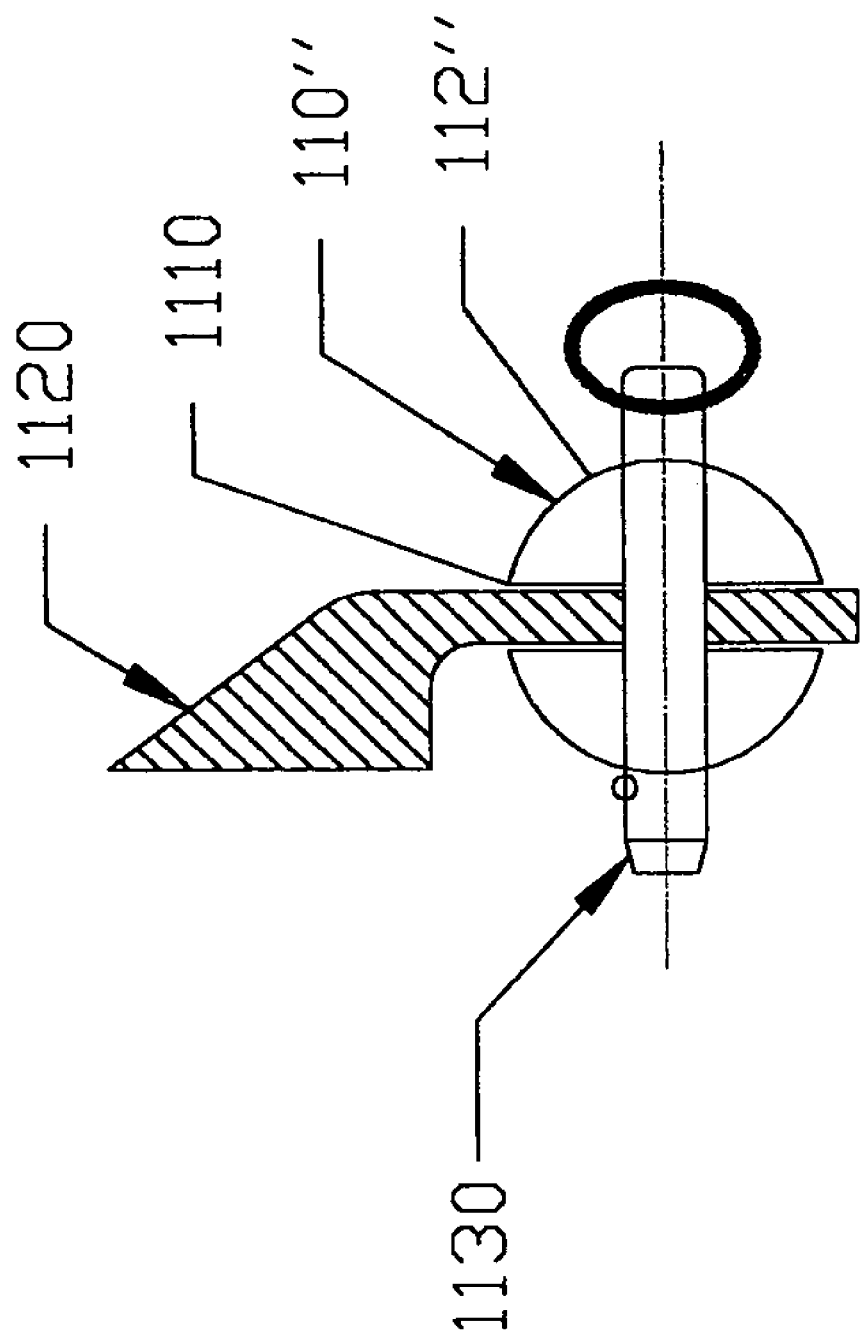
FIG. 21 is an end view cross-section schematic diagram of an alternative blade holder in accordance with the invention.

FIG. 21 is an end view cross-section schematic diagram of an alternative blade holder in accordance with the invention. Occasionally, certain applications require scraper blades that are not easily configured as a snap-on design, or it may be desired that the scraper blade be attached to the blade holder differently. Examples of this include, for example, metallic blades (e.g., blades of stainless steel, aluminum, tungsten carbide), composite blades (constructed from a combination of metals and elastomeric/plastics), or custom blades of various shapes and sizes. An alternative scraper blade 1120 has a geometry of an easily fabricated, customary scraper blade similar to what was described in the background section hereof and is shown to exemplify the applicability of certain aspects of the inventive scraping blade arrangement with conventional blades. As described earlier, the preferred shape of blade holder 110" is a rod 112" and a longitudinal through slot 1110 is machined in rod 112" to receive the body of scraper blade 1120. A through slot 1110 is desired for ease of cleaning, however, in certain cases, a blind slot may provide sufficient support to blade 1120. Blade 1120 is held in blade holder 110" by one or more detent pins 1130 that are diametrically inserted through rod 112" transversely to slot 1110, passing through matching holes in body 1130 of the scraper blade 1120.

While the present invention has been described in terms of the foregoing exemplary embodiments, variations within the scope and spirit of the present invention as defined by the claims following will be apparent to those skilled in the art. For example, the scraping system 100 of the invention may be employed as a primary scraper bearing against conveyor belt 12 where it passes over head pulley 14 of a conveyor system and/or as a secondary scraper bearing against the unloaded conveyor belt 12 as it travels from head pulley 12 to a tail pulley (not shown). Such secondary scraper may be near a return idler or not, as is desired, and may be in an "aggressive orientation" with blade edge 122 closer to head pulley 14 than is blade holder rod 112 or in a "passive orientation" with blade edge 122 farther from head pulley 12 than is blade holder rod 112.

Figure 22:
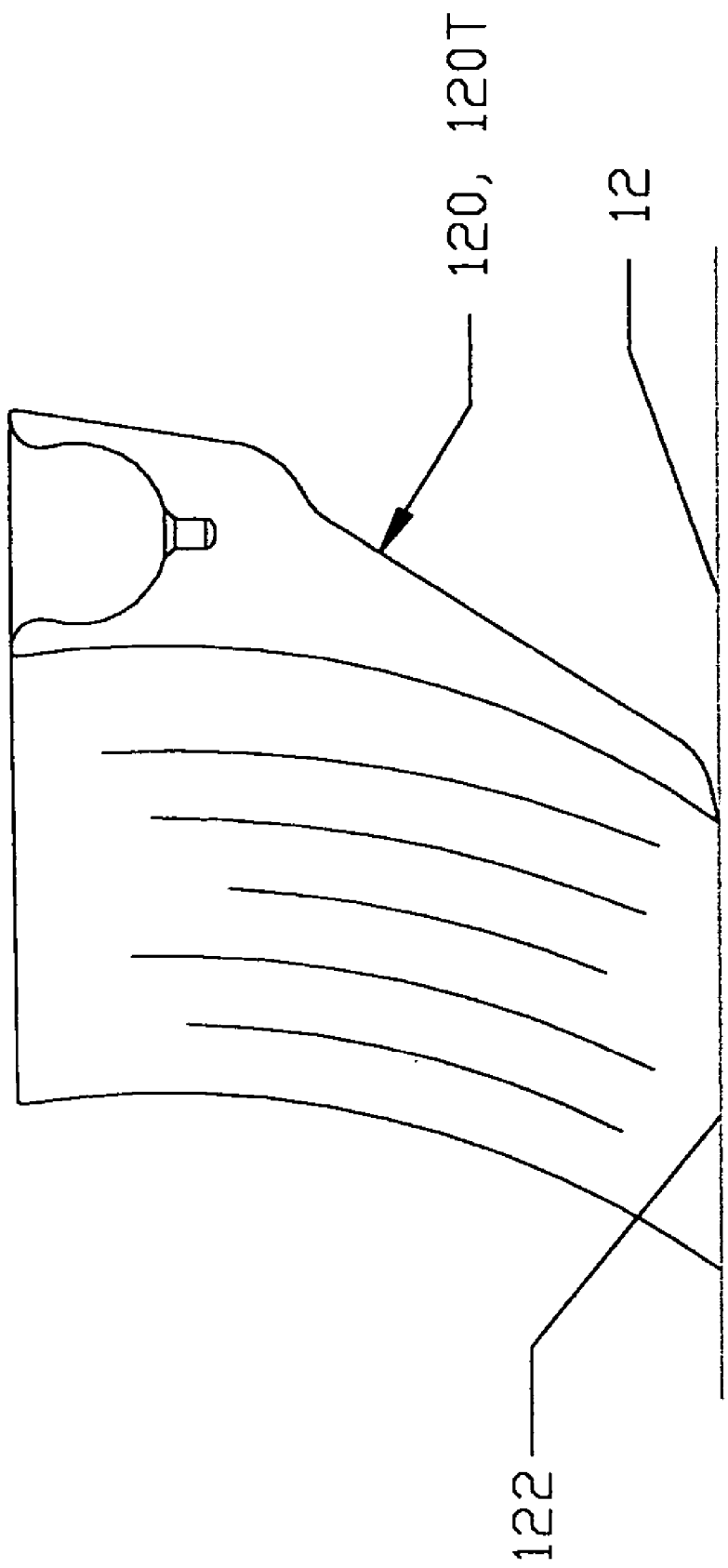
FIG. 22 is a schematic diagram of a scraper utilized as a diverter in accordance with the invention.

Moreover, the invention can also be utilized to directly contact conveyor belt 12 in an approximately longitudinal or in an angled fashion (each also considered to be "transverse" to the belt) to facilitate the directing, diverting, guiding, and/or shaping of product as it is carried along by belt 12. For example, FIG. 22 is a schematic diagram of an arrangement in which scraping apparatus 100 and scraper blade 120' thereof are inverted and positioned above and at an angle (e.g., between 30° and 60°) with respect to conveyor belt 12 to bear against belt 12 under tension from tensioner 200. Blade 120' so placed may extend across the entire width of belt 12 to divert material carried by belt 12 off the edge thereof, or may extend across a portion of the width of belt 12 to move material toward one side thereof, thereby to serve as a diverter or plow for all or part of the material carried by belt 12.

Although scraper assembly 100 is illustrated in relation to a conveyor 12, it may be utilized otherwise. One or more rods, bars or tubes of like length may be positioned between mounting plates 20 with their ends secured thereto by fasteners passing through holes 22 and/or 24 of mounting plates 20. Such rods, bars or tubes hold mounting plates 20 and the other elements of scraping apparatus 100 in the proper spatial relationship absent a conveyor 12 or its support structure 16, and a short section of belt spanning two rods may be utilized to hold blade 120 in position. This may be desirable, e.g., for demonstrating and/or testing operation of, and/or using, an assembled apparatus, although shipping in a disassembled state is also satisfactory.

Although half-can housing 250 is preferably about a half cylinder, it need not be cylindrical but may be of other convenient and preferably arcuate shape. Although collars 220, 230 may be referred to as a collar or as a flange, and although they are preferably separate elements of tensioner 200, at least inner collar may be provided by a cylindrical flange on rod 112, as may be formed by turning, machining, spinning or other forming operation. Further, although collars 220, 230 are preferably in the shape of a cylindrical disk, other shapes may also be utilized.

What is claimed is:

1. A torsional tensioner for tensioning a member comprising:
    a mounting plate having a hole therethrough adapted for rotatably receiving the member;
    an arcuate housing affixed to and extending from said mounting plate and being arcuate about an axis intersecting said mounting plate proximate the hole therein, said arcuate housing having a circumferential slot therein,
    an outer collar spaced away from said mounting plate and having an arcuate edge complementary to the arcuate housing, said outer collar being rotatable with respect to said arcuate housing about an axis substantially intersecting the hole in said mounting plate;
    a clamp for fixing the outer collar rotatably with respect to said arcuate housing within a continuous range of angular positions;
    an inner collar rotatably disposed between said outer collar and said mounting plate, said inner collar having a through hole adapted for receiving the member and being rotatable about an axis substantially intersecting the hole in said mounting plate; and
    a torsion spring coupled between said inner and outer collars for urging relative rotational movement of said inner and outer collars toward a relaxed position of said torsion spring,
    wherein said outer collar has a threaded hole therein and wherein said clamp comprises a handle and a threaded stud extending therefrom through the circumferential slot to engage the threaded hole in said outer collar.

2. A torsional tensioner for tensioning a member comprising:
    a mounting plate having a hole therethrough adapted for rotatably receiving the member;
    an arcuate housing affixed to and extending from said mounting plate and being arcuate about an axis intersecting said mounting plate proximate the hole therein;
    an outer collar spaced away from said mounting plate and having an arcuate edge complementary to the arcuate housing, said outer collar being rotatable with respect to said arcuate housing about an axis substantially intersecting the hole in said mounting plate;
    a clamp for fixing the outer collar rotatably with respect to said arcuate housing within a continuous range of angular positions;
    an inner collar rotatably disposed between said outer collar and said mounting plate, said inner collar having a through hole adapted for receiving the member and being rotatable about an axis substantially intersecting the hole in said mounting plate; and
    a torsion spring coupled between said inner and outer collars for urging relative rotational movement of said inner and outer collars toward a relaxed position of said torsion spring,
    wherein one of said outer collar and said clamp has a threaded hole therein and the other of said outer collar and said clamp includes a threaded stud extending therefrom, wherein said threaded stud engages the threaded hole.

3. The tensioner of claim 2 wherein said arcuate housing has a circumferential slot therein and wherein said clamp engages said outer collar through the circumferential slot.

4. The tensioner of claim 3 wherein positioning said clamp at an end of the circumferential slot corresponds to said torsion spring having a predetermined spring tension.

5. The tensioner of claim 3 wherein said arcuate housing has a further slot extending from the circumferential slot to an end of the arcuate housing.

6. The tensioner of claim 5 wherein a first end of said torsion spring is permanently fastened to said inner collar and a second end of said torsion spring is permanently fastened to said outer collar, whereby said torsion spring and said inner and outer collars are removable as a unitary member by moving said clamp through the further slot.

7. The tensioner of claim 5 wherein the further slot extends to an end of the arcuate housing distal said mounting plate.

8. The tensioner of claim 2 wherein said inner and outer collars each includes a hole in which is disposed a respective end of said torsion spring.

9. The tensioner of claim 2 wherein one end of said torsion spring is permanently fastened to one of said inner and outer collars.

10. The tensioner of claim 2 wherein a first end of said torsion spring is permanently fastened to said inner collar and a second end of said torsion spring is permanently fastened to said outer collar, whereby said torsion spring and said inner and outer collars are removable as a unitary member.

11. The tensioner of claim 2 wherein said mounting plate has at least one of a circular hole, a slot, a "T"-shaped slot and a combination thereof.

12. A torsional tensioner for tensioning a member comprising:
    a mounting plate having a hole therethrough adapted for rotatably receiving the member;
    an arcuate housing affixed to and extending from said mounting plate and being arcuate about an axis intersecting said mounting plate proximate the hole therein;
    an outer collar spaced away from said mounting plate and having an arcuate edge complementary to the arcuate housing, said outer collar being rotatable with respect to said arcuate housing about an axis substantially intersecting the hole in said mounting plate;
    a clamp for fixing the outer collar rotatably with respect to said arcuate housing within a continuous range of angular positions;
    an inner collar rotatably disposed between said outer collar and said mounting plate, said inner collar having a through hole adapted for receiving the member and being rotatable about an axis substantially intersecting the hole in said mounting plate; and
    a torsion spring coupled between said inner and outer collars for urging relative rotational movement of said inner and outer collars toward a relaxed position of said torsion spring, wherein said clamp includes at least one of a clutch, an anti-vibration device, or both.

13. The tensioner of claim 12 wherein a first end of said torsion spring is permanently fastened to said inner collar and a second end of said torsion spring is permanently fastened to said outer collar, whereby said torsion spring and said inner and outer collars are removable as a unitary member.

14. The tensioner of claim 12 wherein said arcuate housing has a circumferential slot therein disposed in a direction of rotation of said outer rotatable collar, and wherein said clamp engages said outer rotatable collar through the circumferential slot.

15. The tensioner of claim 14 wherein positioning said clamp at an end of the circumferential slot corresponds to said torsion spring having a predetermined spring tension.

16. A tensioner for a scraper including a blade holder rotatable about an axis for tensioning a scraper blade connected to the blade holder, said tensioner comprising:
   a semi-cylindrical member above and extending in the direction of the axis of said blade holder, wherein a central axis of said semi-cylindrical member is substantially parallel to the axis of the blade holder;
   a first collar disposed under said semi-cylindrical member engaging the blade holder and rotatable therewith;
   a second collar disposed under and releasably engaging said semi-cylindrical member, wherein said second collar engages said semi-cylindrical member for setting a tension and releases from said semi-cylindrical member for removal therefrom;
   a torsional spring engaging said first and second collars for providing torsional tension therebetween when said second collar engages said semi-cylindrical member; and
   a clamp engaging said second collar through a circumferential slot in said semi-cylindrical member,
   wherein one of said second collar and said clamp has a threaded hole therein and the other of said second collar and said clamp includes a threaded stud extending therefrom, wherein said threaded stud engages the threaded hole.

17. The tensioner of claim 16 wherein said semi-cylindrical member has a circumferential slot therein and wherein a clamp engages said second collar through the circumferential slot.

18. The tensioner of claim 17 wherein positioning said clamp at an end of the circumferential slot corresponds to said torsional spring having a predetermined spring tension.

19. The tensioner of claim 17 wherein said semi-cylindrical member has a further slot extending from the circumferential slot to an end of the semi-cylindrical member.

20. The tensioner of claim 19 wherein a first end of said torsional spring is permanently fastened to said first collar and a second end of said torsional spring is permanently fastened to said second collar, whereby said torsional spring and said first and second collars are removable as a unitary member by moving said clamp through the further slot.

21. A tensioner for a scraper including a blade holder rotatable about an axis for tensioning a scraper blade connected to the blade holder, said tensioner comprising:
   a semi-cylindrical member above and extending in the direction of the axis of said blade holder, wherein a central axis of said semi-cylindrical member is substantially parallel to the axis of the blade holder;
   a first collar disposed under said semi-cylindrical member engaging the blade holder and rotatable therewith;
   a second collar disposed under and releasably engaging said semi-cylindrical member, wherein said second collar engages said semi-cylindrical member for setting a tension and releases from said semi-cylindrical member for removal therefrom;
   a torsional spring engaging said first and second collars for providing torsional tension therebetween when said second collar engages said semi-cylindrical member; and
   a clamp engaging said second collar through a circumferential slot in said semi-cylindrical member,
   wherein said clamp includes at least one of a clutch, an anti-vibration device, or both.

22. A tensioner for a belt scraper including a blade holder rod rotatable about a rotation axis for tensioning a scraper blade disposed on the blade holder rod, said tensioner comprising:
   a fixed mounting plate;
   a semi-cylindrical housing attached to the mounting plate above and extending in the direction of the rotation axis of said blade holder rod, wherein a central axis of said semi-cylindrical housing is substantially parallel to the rotation axis of the blade holder rod;
   a first rotatable collar disposed under said semi-cylindrical housing, wherein the blade holder rod engages said first rotatable collar to be rotatable therewith about the rotation axis;
   a second rotatable collar disposed under and releasably engaging said semi-cylindrical housing, wherein said second rotatable collar engages said semi-cylindrical housing for setting a tension and releases from said semi-cylindrical housing for removal therefrom;
   a torsional spring disposed under said semi-cylindrical housing, said torsional spring having first and second ends engaging said first rotatable collar and said second rotatable collar, respectively, for providing torsional tension therebetween when said second rotatable collar engages said semi-cylindrical housing; and
   a clamp engaging said second rotatable collar through a circumferential slot in said semi-cylindrical housing,
   wherein said clamp includes at least one of a clutch, an anti-vibration device, or both.

23. The tensioner of claim 22 wherein said semi-cylindrical housing has a circumferential slot therein and wherein a clamp engages said second rotatable collar through the circumferential slot.

24. The tensioner of claim 23 wherein positioning said clamp at an end of the circumferential slot corresponds to said torsional spring having a predetermined spring tension.

25. The tensioner of claim 23 wherein said semi-cylindrical housing has a further slot extending from the circumferential slot to an end of the semi-cylindrical housing.

26. The tensioner of claim 25 wherein a first end of said torsional spring is permanently fastened to said first rotatable collar and a second end of said torsional spring is permanently fastened to said second rotatable collar, whereby said torsional spring and said first and second rotatable collars are removable as a unitary member by moving said clamp through the further slot.

27. The tensioner of claim 22 wherein a first end of said torsional spring is permanently fastened to said first rotatable collar and a second end of said torsional spring is permanently fastened to said second rotatable collar, whereby said torsional spring and said first and second rotatable collars are removable as a unitary member.

28. A tensioner comprising:
a unitary tensioning assembly including:
- a blade holder rod rotatable about a rotation axis;
- a first rotatable collar affixed to said blade holder rod and rotatable therewith about the rotation axis;
- a second rotatable collar spaced apart from said first rotatable collar in a direction along the rotation axis; and
- a torsional spring extending in the direction along the rotation axis between said first and second rotatable collars, said torsional spring having first and second ends affixed to said first rotatable collar and to said second rotatable collar, respectively, for providing torsional tension therebetween when said first rotatable collar is rotated relative to said second rotatable collar; and a mount for said unitary tensioning assembly including:
- a fixed arcuate housing disposed above at least the first and second rotatable collars of said unitary tensioning assembly and being arcuate in the direction about the rotation axis and said first and second rotatable collars, said fixed arcuate housing having a circumferential slot therein disposed in a direction of rotation of said second rotatable collar,
- whereby said fixed arcuate housing is in a position to shield at least part of said unitary tensioning member from falling debris; and
- an engaging device including a clamp for releasably engaging said second rotatable collar and said fixed arcuate housing through the circumferential slot in said fixed arcuate housing,
- wherein said arcuate housing has a further slot extending from the circumferential slot to an end of the arcuate housing, whereby said clamp may be removed from said circumferential slot via said further slot.

29. The tensioner of claim 28 wherein a first end of said torsional spring is permanently fastened to said first rotatable collar and a second end of said torsional spring is permanently fastened to said second rotatable collar, whereby said torsional spring and said first and second rotatable collars are removable as a unitary member by moving said clamp through the further slot.

30. A tensioner comprising:
a unitary tensioning assembly including:
- a blade holder rod rotatable about a rotation axis;
- a first rotatable collar affixed to said blade holder rod and rotatable therewith about the rotation axis;
- a second rotatable collar spaced apart from said first rotatable collar in a direction along the rotation axis; and
- a torsional spring extending in the direction along the rotation axis between said first and second rotatable collars, said torsional spring having first and second ends affixed to said first rotatable collar and to said second rotatable collar, respectively, for providing torsional tension therebetween when said first rotatable collar is rotated relative to said second rotatable collar; and a mount for said unitary tensioning assembly including:
- a fixed arcuate housing disposed above at least the first and second rotatable collars of said unitary tensioning assembly and being arcuate in the direction about the rotation axis and said first and second rotatable collars, said fixed arcuate housing having a circumferential slot therein disposed in a direction of rotation of said second rotatable collar,
- whereby said fixed arcuate housing is in a position to shield at least part of said unitary tensioning member from falling debris; and
- an engaging device including a clamp for releasably engaging said second rotatable collar and said fixed arcuate housing through the circumferential slot in said fixed arcuate housing, wherein said clamp includes at least one of a clutch, an anti-vibration device, or both.

31. The tensioner of claim 30 wherein a first end of said torsional spring is permanently fastened to said first rotatable collar and a second end of said torsional spring is permanently fastened to said second rotatable collar, whereby said torsional spring and said first and second rotatable collars are removable as a unitary member.

* * * * *